United States Patent
Lenkov et al.

(10) Patent No.: US 8,682,795 B2
(45) Date of Patent: Mar. 25, 2014

(54) TRUSTED INFORMATION EXCHANGE BASED ON TRUST AGREEMENTS

(75) Inventors: Dmitry Lenkov, San Jose, CA (US); Mark V. Scardina, San Francisco, CA (US); Douglas Hood, Redwood Shores, CA (US); Rama Vissapragada, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1304 days.

(21) Appl. No.: 11/518,481

(22) Filed: Sep. 7, 2006

(65) Prior Publication Data

US 2007/0067630 A1    Mar. 22, 2007

Related U.S. Application Data

(60) Provisional application No. 60/717,855, filed on Sep. 16, 2005.

(51) Int. Cl.
*G07G 1/12* (2006.01)

(52) U.S. Cl.
USPC .............................. 705/51; 705/52; 380/201

(58) Field of Classification Search
USPC ....................................................... 705/50–79
See application file for complete search history.

(56) References Cited

U.S. PATENT DOCUMENTS

| | | | | |
|---|---|---|---|---|
| 5,724,425 A | * | 3/1998 | Chang et al. | 705/52 |
| 5,870,469 A | * | 2/1999 | Albert et al. | 713/187 |
| 5,878,417 A | * | 3/1999 | Baldwin et al. | 1/1 |
| 5,899,983 A | * | 5/1999 | Hussmann | 705/44 |
| 5,933,504 A | * | 8/1999 | Vanstone et al. | 380/30 |
| 5,935,246 A | * | 8/1999 | Benson | 726/28 |
| 5,943,423 A | * | 8/1999 | Muftic | 705/67 |
| 5,946,396 A | * | 8/1999 | Davis | 713/178 |
| 5,946,397 A | * | 8/1999 | M'Raihi et al. | 380/30 |
| 5,949,877 A | * | 9/1999 | Traw et al. | 713/171 |
| 5,950,195 A | * | 9/1999 | Stockwell et al. | 1/1 |
| 5,958,073 A | * | 9/1999 | White | 714/37 |
| 5,968,136 A | * | 10/1999 | Saulpaugh et al. | 710/3 |
| 5,999,921 A | * | 12/1999 | Arsenault et al. | 705/410 |
| 6,052,469 A | * | 4/2000 | Johnson et al. | 380/286 |
| 6,067,575 A | * | 5/2000 | McManis et al. | 719/313 |
| 6,092,194 A | * | 7/2000 | Touboul | 726/24 |
| 6,108,420 A | * | 8/2000 | Larose et al. | 705/59 |
| 6,108,425 A | * | 8/2000 | Smith et al. | 380/277 |
| 6,122,372 A | * | 9/2000 | Hughes | 380/2 |
| 6,138,119 A | * | 10/2000 | Hall et al. | 1/1 |
| 6,148,401 A | * | 11/2000 | Devanbu et al. | 713/170 |
| 6,148,404 A | * | 11/2000 | Yatsukawa | 726/2 |
| 6,151,648 A | * | 11/2000 | Haq | 710/107 |
| 6,154,844 A | * | 11/2000 | Touboul et al. | 726/24 |
| 6,160,423 A | * | 12/2000 | Haq | 327/41 |

(Continued)

*Primary Examiner* — Evens J Augustin
(74) *Attorney, Agent, or Firm* — Hickman Palermo Truong Becker Bingham Wong LLP

(57) ABSTRACT

Techniques are provided for allowing organizations to preserve the trust and allow this trust to be propagated across multiple agencies and/or enterprises. A technology is provided that allows (mutually) trusted entities to share content (information, digital assets) over any protocol-based network such as the Internet based on granted rights and agreed conditions. In one embodiment, Trusted Information Exchange (TIE) systems have a Service Oriented Architecture (SOA) and use content (information, asset) repositories to store and forward content to trusted entities on the Internet. Techniques are provided to permit source TIE systems to manage the specific disposition and management of their assets to receiving TIE systems through directions conveyed in licenses that reflect apriori agreements.

4 Claims, 19 Drawing Sheets

(56) References Cited

U.S. PATENT DOCUMENTS

| | | | |
|---|---|---|---|
| 7,353,535 B2* | 4/2008 | Kaler et al. | 726/5 |
| 7,634,429 B2* | 12/2009 | Narin et al. | 705/26.8 |
| 7,805,371 B2* | 9/2010 | Demartini et al. | 705/51 |
| 7,895,651 B2* | 2/2011 | Brennan | 726/22 |
| 7,900,247 B2* | 3/2011 | Chong | 726/10 |
| 8,037,036 B2* | 10/2011 | Blumenau et al. | 707/694 |
| 8,074,223 B2* | 12/2011 | Birkestrand | 718/104 |
| 8,145,593 B2* | 3/2012 | Nayak et al. | 707/607 |
| 8,220,057 B2* | 7/2012 | Clerc | 726/26 |
| 8,272,058 B2* | 9/2012 | Brennan | 726/24 |
| 8,386,420 B2* | 2/2013 | Nayak et al. | 707/607 |
| 8,402,555 B2* | 3/2013 | Grecia | 726/29 |
| 8,474,027 B2* | 6/2013 | Meijer et al. | 726/9 |
| 2004/0220878 A1* | 11/2004 | Lao et al. | 705/51 |
| 2005/0060584 A1* | 3/2005 | Ginter et al. | 713/201 |

\* cited by examiner

TRUSTED INFORMATION EXCHANGE BASED ON TRUST AGREEMENTS

PRIORITY CLAIM

This application claims priority to U.S. Provisional Patent Application Ser. No. 60/717,855, entitled MECHANISM FOR TRUSTED INFORMATION EXCHANGE BASED ON TRUST AGREEMENTS REPRESENTED BY RIGHTS EXPRESSION LANGUAGE LICENSES, filed on Sep. 16, 2005, the contents of which are herein incorporated by reference in their entirety for all purposes.

FIELD OF THE INVENTION

The present invention relates exchanging digital information and, more specifically, to systems that facilitate trusted information exchange.

BACKGROUND

Information interchange, whether intentional or inadvertent, authorized or unauthorized, malicious or benign, has become a prime concern for executives and government decision-makers in today's environment of digital information, instant global distribution, and cyber-crime. Security alone is not a sufficient condition to control or motivate information sharing in today's distributed systems environment.

With respect to information control, it may be just as important to get information into the right hands, as it is to keep information out of the wrong hands. For example, the 9/11 Commission concluded that it was not the security of information, but the inability for government agencies to easily share information, that hampered prevention. Accordingly, the 9/11 Commission directed the President to implement a "trusted information network". This need for trust equally applies in today's regulated world, where governments, medical centers, universities, and businesses alike have a real need to share data with principals who are trusted and appropriately authorized.

Exchanging sensitive information across organizational boundaries requires that data be controlled, managed, and limited in its access and distribution. Over the years, this has led to the development of more sophisticated and robust processes in the physical world, driving the creation and success of overnight delivery services and the acceptance of the facsimile for business use. In today's environment, government agencies and enterprises recognize the value of electronic communication as a faster and more convenient means of doing business, but security and trust remain elusive.

The challenge for organizations is how to exchange sensitive or valuable data without losing control of it or having it end up in the wrong hands. It is very important that the mutual trust between agencies and government departments, as well as between enterprises, is preserved, as is the confidentiality of the digital content being exchanged.

BRIEF DESCRIPTION OF THE DRAWINGS

The present invention is illustrated by way of example, and not by way of limitation, in the figures of the accompanying drawing, in which like reference numerals refer to similar elements and in which.

DETAILED DESCRIPTION

Figure 1:
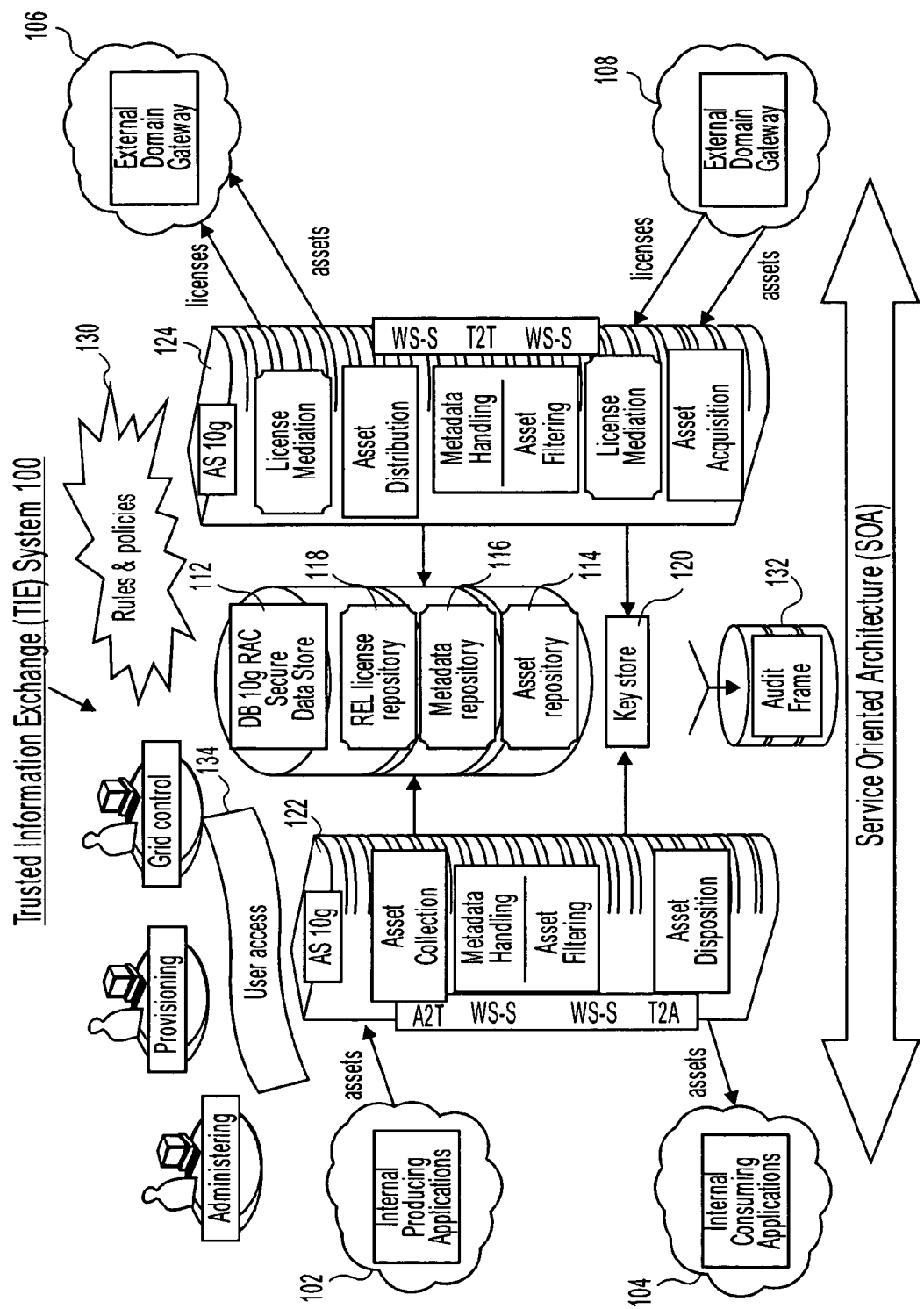
FIG. 1 is a block diagram that illustrates a system 100 for sharing information, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for allowing organizations to exchange information and data in a manner that preserves trust, and allows this trust to be propagated across multiple agencies and/or enterprises. This requires a new technology that supports exchange of content (digital assets) based on trusted information agreements between organizations. The techniques described herein are simple enough to encourage broad use and acceptance, yet robust, scalable, and flexible enough to be used in mission-critical and crisis situations.

According to one aspect, a technology is provided that allows (mutually) trusted entities to share content (information, digital assets) over the Internet based on granted rights and agreed conditions. In one embodiment, Trusted Information Exchange (TIE) systems have a Service Oriented Architecture (SOA) and use content (information, asset) repositories to store and forward content to trusted entities on Wide Area Networks, such as the Internet.

According to another aspect, techniques are provided to permit source TIE systems to manage the specific disposition and management of their assets by receiving TIE systems through directions conveyed in licenses that reflect apriori agreements.

In one embodiment, information exchange involves asset collection, distribution, acquisition, and disposition. Asset collection is a process of accepting and processing assets from internal producing applications, filtering them, decrypting and encrypting them, and storing them and associated metadata into corresponding repositories. Asset distribution is a process of distributing assets collected from internal applications to other, external agencies, or departments. The asset distribution process is preceded by the license generation and resulting mediation. Asset acquisition is a process of accepting and processing assets from external agencies, or departments, filtering them, decrypting and encrypting them, and storing them and associated metadata into corresponding repositories. Asset disposition is a process of disposing assets acquired from other agencies, or departments, for internal processing.

According to one embodiment, secure web services (OASIS WS-S) are used during license mediation that facilitates trusted asset distribution and asset acquisition. For asset collection and asset disposition, web services (either secure or not secure) are used. For asset transfer, various transfer mechanisms may be used, including web services, secure WS, and FTP, depending on the circumstances.

According to another aspect, license mediation is used as a mechanism for establishing trust between participating parties (agencies, departments). Licenses include granted rights and conditions in regard to assets to be distributed. The mediation process includes licenses generation, license validation, and confirmation of acceptance or rejection. Also, approval work flows might participate in the license mediation process on one participation side or both. Licenses that are mediated between participating parties include confirmation licenses for the confirmation of identities of participation parties, subscription TIE licenses that grant rights to receive assets (information) of a particular type (topic or a set of topics, classification, etc.), subscription termination licenses, and asset licenses.

Both subscription and asset licenses can be either usage licenses or distribution licenses. Distribution licenses serve as a mechanism for trust propagation. In one embodiment, all licenses are represented using the ISO Rights Expression Language (REL) standard, and OASIS REL Token Profile standard is used for distributing the licenses. The MPEG Rights Expression Language (REL) is an ISO standard developed by MPEG, and described in the ISO 21000-5 MPEG Specification. For the purpose of Trusted Information Exchange, REL profile and REL extensions are provided.

Assets

A piece of digital information is referred to herein as an asset. Assets may take a virtually infinite variety of forms, including but not limited to electronic files, database records, digital information that represents the money in a bank account, a battle plan, etc. The techniques described herein are not limited to any particular type of asset.

A party that initially controls the rights to an asset is referred to herein as an asset source. Specifically, an asset source is an entity that has the authority to provide asset use rights to third parties, either as the intrinsic asset owner/creator, or by having such transferable rights granted to it. A party that does not initially control an asset, but that wants to use the asset, is referred to herein as an asset user. Techniques are described herein that allow asset sources to share assets with those asset users that are willing to abide by trust agreements that govern the assets.

Trust Agreements

A "trust agreement" is digital information that represents an agreement between two parties relative to an asset or set of assets. The party providing the trust agreement is referred to herein as the agreement source. The party to whom the trust agreement is provided is referred to herein as the agreement target.

As shall be explained in greater detail hereafter, the "agreement target" is not necessarily the "asset user". However, the agreement target must have the trust responsibility over the asset user from the perspective of the asset owner. The same responsibility exists between asset owner and agreement target to complete the trust chain. That is, the agreement source/target acts as a trust proxy for the asset owner/user.

According to one embodiment, a trust agreement (1) identifies an asset, and (2) specifies rights and conditions that restrict what the agreement target can do relative to the asset. Optionally, the trust agreement may also describe the asset. The trust agreement relating to a file may, for example, identify the file, and indicate specific individuals within the agreement target that are allowed to view the file. As another example, a trust agreement relating to bank account information may identify the specific bank account, and impose restrictions on how account data (information) can be distributed. Thus, if the account data could only be used for bank investments, then the data could be restricted from going to brokers. Additionally, the license can contain use restrictions that are conveyed but not enforced by the TIE.

Trust agreements may be implemented in a variety of ways. For the purpose of explanation, embodiments will be described in which trust agreements are implemented as Rights Expression Language (REL) licenses. However, the techniques described herein are not limited to any particular implementation of trust agreements.

Trust Agreement Elements

A trust agreement specifies rules that relate to an asset. The rules specified in the trust agreement may govern any number of topics relating to the asset. For example, the trust agreement may specify:
  Disposition rules (intra-organization usage), such as:
    who at the agreement target can use the asset
    how, when and where those at the agreement target can use the asset
  Distribution rules (inter-organization distribution), such as:
    under what circumstances can the agreement target provide the asset to third parties
    what terms the agreement target must bind those third parties to prior to providing the asset to them
  Semantic rules, such as:
    what language is to be used to communicate the asset to the agreement target how the asset is to be translated by the agreement target (vocabulary translation/mapping)

Acceptance rules, such as:

an acceptance deadline

Legal conditions, such as:

waivers of liability governing law arbitration

As an example of vocabulary translation/mapping rules, consider a scenario in which an agency A uses the authorization categories "top secret", "secret" and "unclassified", while another agency B used the authorization categories "confidential" and "public". In this scenario, the trust agreement may establish the rule that "top secret", "secret" assets provided by agency A to agency B are to be treated as "confidential" assets by agency B. As another example, the trust agreement may specify that agency A will provide assets using the "language" of agency B. Thus, even though a particular asset is "top secret" to agency A, agency A specifies that the asset is "confidential" when the asset is provided to agency B.

The types of rules and conditions mentioned in this section are merely examples of the types of rules and conditions that may be included in a trust agreement. There is virtually no limit to the types of rules and conditions that may be specified in a trust agreement.

According to one embodiment, assets are exchanged with the understanding that the agreement target receives no implicit rights. Thus, if the trust agreement does not explicitly grant a distribution license to the agreement target, then the agreement target has no license to distribute the asset. Because the asset source is able to dictate the express terms of the trust agreement, and no implicit license exists, asset sources will be much less reticent to share their digital assets. The increased sharing of digital assets may have significant social ramifications, such as improving anti-terrorist efforts.

Types of Trust Agreements

The techniques described herein may be used with a variety of types of trust agreements, including asset trust agreements and subscription trust agreements. Asset trust agreements govern explicitly identified assets. For example, an asset trust agreement may cover an expressly identified spreadsheet.

Subscription trust agreements do not explicitly identify assets, but identify characteristics of the assets that are governed by the trust agreement. The assets covered by a subscription trust agreement may not even exist at the time the subscription trust agreement is executed. For example, a subscription trust agreement may cover all spreadsheets created by a particular person. In that example, even those spreadsheets created by that particular person after the trust agreement is executed would be covered by the subscription trust agreement.

According to one embodiment, an asset that is covered by a subscription trust agreement is not automatically provided to the agreement target of the subscription trust agreement. Instead, when a new asset covered by a subscription trust agreement is detected, an asset trust agreement is automatically sent to the agreement target of the subscription trust agreement. Alternatively, the asset trust agreement may be sent to the agreement target in response to a request (query) from the agreement target. The asset trust agreement explicitly identifies the asset. Even though the agreement target has already agreed to the subscription trust agreement, the asset is not provided until the agreement target also accepts the asset trust agreement.

Nested Trust Agreements

In one embodiment, a subscription trust agreement includes a nested asset trust agreement. The nested asset trust agreement is embedded in the subscription trust agreement and communicates to the agreement target the terms that will be in the asset trust agreements that will be sent for all assets covered by the subscription trust agreement. Because the asset trust agreement terms are embedded in the subscription trust agreement, the agreement target can agree to the subscription trust agreement with a confidence that the subsequent asset trust agreements will not contain any unexpected terms.

Trust Agreement Scenarios

In a typical scenario, the asset source of an asset is the agreement source of the trust agreement that governs the asset. Similarly, the agreement target is an asset user that desires to use or distribute the asset or the right to use it. However, as shall be described in greater detail hereafter, the techniques described herein may be employed in scenarios in which the agreement source is not the asset source, and/or the agreement target is not an asset user.

When a party is both the asset source and the agreement source, that party still provides the asset separate from the trust agreement, because the asset should not be sent unless a confirmation (acceptance of the trust agreement) is received by the agreement source. Thus, the trust agreement is provided to the agreement target first. Then, the asset itself is separately provided to the agreement target only after the asset source receives a "trust confirmation" from the agreement target.

Trust Confirmations

A "trust confirmation" is information sent from an agreement target to an agreement source that indicates that the agreement target is willing to abide by the terms of a trust agreement that was provided by the agreement source.

According to one embodiment, the trust confirmation includes (1) the trust agreement, and (2) a signature of the agreement target. According to one embodiment, the signature of the agreement target that is included in the trust confirmation is a digital signature.

Peer-To-Peer Authentication

Significantly, parties may exchange digital assets using the TIE systems described herein without relying on a third party for authentication. Rather, the parties can participate in peer-to-peer authentication by determining for themselves the validity of the signatures contained in the messages received from other parties. According to one embodiment, parties could securely exchange x.509 certificates outside of the TIE system flows which could then be used to authenticate signatures in TIE system communications. In some embodiments, third-party authentication is used, either instead of or in addition to peer-to-peer authentication. In such embodiments, third-party authentication is used in a manner that does not conflict with the peer-to-peer exchange paradigm.

Trust Propogation

According to one embodiment, techniques are provided to support situations in which the relationship between an asset source and asset users is indirect. For example, an asset source may enter a trust agreement with a distributor that allows the distributor to distribute an asset to third party asset users. In this scenario, the trust agreement between the asset source and the distributor may include an embedded trust agreement to which the distributor must bind the asset users. The asset source provides the asset to the distributor only after the asset source receives a trust confirmation from the distributor. Similarly, the distributor provides the asset to an asset user only after the distributor receives a trust confirmation from that asset user.

Mutual Semantic Non-Repudiation

According to one embodiment, TIE systems are used to exchange information in a manner that results in mutual semantic non-repudiation. Specifically, to achieve mutual semantic non-repudiation, the trust agreement negotiation process provides each party to the trust agreement an electronic copy of the trust agreement that has been digitally signed by the other party. Further, no electronic assets are exchanged under any trust agreement until each party has the other party's digital signature on a validated electronic trust agreement containing the mutually accepted license terms.

Trust agreements are electronic records that represent consent and execution of a legal document. In some cases, the trust agreements themselves may be legal documents that contractually bind both parties when mutually accepted. Trust agreements are also referred to herein as "licenses", because among other things, trust agreements govern what agreement targets are licensed to do under the agreement.

According to one embodiment, an asset source does not make available any assets under a trust agreement until the asset source has a digitally signed trust confirmation from the asset consumer. Conversely, an asset consumer does not consume any asset until the asset consumer has a digitally signed trust agreement from the asset source.

According to one embodiment, non-repudiation in subscription scenarios applies both to the subscription license, and to each asset that would be delivered under the subscription license. In such an embodiment, the asset source does not make available an asset under the subscription license until the asset source has a digitally signed subscription license confirmation, and a digitally signed asset license confirmation. Similarly, the asset consumer does not consume any asset until the asset consumer has both a digitally signed subscription license, and a digitally signed asset license for the particular asset that is to be provided.

Binding and Monitoring

According to one embodiment, a trust agreement can bind an agreement target to terms that the agreement source is not able to monitor. For example, a trust agreement may specify that a target agency is only allowed to make five copies of a given electronic asset. Once the asset is delivered to the target agency under the license, the agreement source may not have any way of monitoring the internal distribution of the asset within the target agency. However, because of the mutually signed trust agreement, the target source would have legal recourse if the target agency violates the terms.

Similarly, a distribution agreement may obligate a distributor to bind third parties to terms that cannot be monitored by the distributor. For example, a distribution agreement may include an embedded end-user agreement, and require the distributor to distribute the asset to only those third-parties that agree to that exact end-user agreement. The end-user agreement may, in turn, only grant end-users the ability to use an asset for a short trial period. In this example, the distributor is not obligated to monitor the third-parties to ensure that they cease using the asset after the trial period. However, the distributor is obligated to bind the third-parties to the end-user agreement so that there is legal recourse against any third-party that uses the electronic asset beyond the trial period.

Any given trust agreement may include some terms whose compliance the agreement source has the ability to monitor, and some terms whose compliance the agreement source does not have the ability to monitory. Further, trust agreements may require agreement targets to bind third parties to some terms whose compliance the agreement targets can monitor, and to some terms that that agreement targets do not have the ability to monitor. The fact that a party's ability to monitor does not restrict the terms under which that party is able to exchange assets allows for a flexible system that can be adjusted based on the degree of trust between parties.

Asset Collection, Distribution, Acquisition, and Disposition

Asset collection generally refers to the process of identifying and/or extracting assets controlled by an asset source. Asset collection may involve, for example, retrieving data from legacy applications and/or databases, and storing the data in a secure data store. Asset collection typically involves accepting and processing assets from internal producing applications, filtering them, decrypting and encrypting them, and storing them and associated metadata into corresponding repositories.

Asset distribution generally refers to the process of providing assets to an external source. Typically, the asset distribution process is preceded by the license mediation.

Asset acquisition generally refers to the process of obtaining assets from an external source. Asset acquisition typically involves accepting and processing assets from external agencies, or departments, filtering them, decrypting and encrypting them, and storing them and associated metadata into corresponding repositories.

Asset disposition generally refers to the process of acting upon assets obtained from external sources. Thus, asset disposition typically involves distributing assets acquired from other agencies, or departments, for internal processing.

Example Tie System

Referring To FIG. 1, it is a block diagram that illustrates a TIE system 100 for sharing information, according to an embodiment of the invention. TIE system 100 employs a TIE infrastructure that allows (mutually) trusted entities to share content over the Internet based on granted rights and agreed conditions. In the illustrated embodiment, TIE system 100 employs a Service Oriented Architecture (SOA) and uses a content repository to store and forward content to trusted entities over the Internet. Mobile TIE also supports content exchange with mobile devices.

SOA (Service Oriented Architecture)

SOA separates a particular service's implementation ("how") from its interface ("what"). Service consumers view it as an endpoint that supports a particular request under a certain semantic contract that the Service publishes. As long as the consumers interact with the Service under the terms (protocol, usage, and interface) of the "service" contract, the consumers can use the service without actually knowing the details of the implementation.

Internal Producing Applications

TIE system 100 includes internal producing applications 102. Internal producing applications 102 generally represent applications, often legacy applications encapsulated with web services, which are used by the content owning agencies (departments) to submit content, or assets, (information, digital content) to a local TIE for its distribution to other agencies. Such application is often a vertical solution that has been built to share information within an organization and does not have security/infrastructure capabilities for content exchange or distribution (to trusted entities) over the Internet.

Internal Consuming Applications

TIE system 100 also includes internal consuming applications 104. Internal consuming applications 104 generally represent applications that are used by agencies, or departments, to process assets delivered from other agencies, or departments. In some cases they are legacy applications, sometimes encapsulated with web services. Internal consuming applications 104 can also be just destination addresses or names of people (email addresses, for example) to be notified.

External Domain Gateway

TIE system 100 also includes external domain gateways 106 and 108. External domain gateways 106 and 108 generally represent secure gateways through which TIE system 100 interacts with other systems. The other systems with which TIE system 100 interacts may be, for example, TIEs of another external agency or department, that assets are distributed to or acquired from.

License Mediation

License mediation generally refers to the process of distributing licenses to or receiving licenses from other external agencies or departments. License mediation involves license generation and license validation on the other side. The license validation involves license authentication, metadata validation and approval workflows. According to one embodiment, all licenses are encoded in REL.

Metadata Handling

Metadata handling refers to handling all semantics associated with asset collection, distribution, acquisition, and disposition. Metadata includes, for example, license, asset metadata, subscription subject metadata, constraint metadata and other metadata generations that may be useful to the asset user. Handling refers to any metadata transferring, mapping, transformation and validation processes.

Asset Filtering

Asset filtering involves applying one or more filters to assets to determine whether the assets can be distributed to other TIEs. The filters may include cipher process, virus and malicious code scan, dirty word search, file type validation, and others, including specific to a particular agency. The filters might include an associated workflow as in a review by an authorized person. A "cipher process" refers to the process of encrypting and decrypting assets, when necessary. A "virus and malicious code scan" refers to the process of scanning for viruses and malicious code. A "dirty word search" refers to the process of searching for words and sentences that are not authorized for the distribution to external agencies applications, departments, etc. A "file type validation" refers to the process of confirming the format of the file conforms to its expected application type.

Secure Data Store

In the illustrated embodiment, TIE system 100 includes a secure data store 112. Secure data store 112 serves as an asset repository 114, a metadata repository 116 and a REL license repository. Within the secure data store 112, asset repository 114 keeps, over a specified period of time, the assets that need to be distributed. In one embodiment, assets are filtered before the assets are stored in asset repository 114. Assets can kept in the repository for a specified period of time. For a particular asset, this period can depend on the asset expiration date, whether the asset was distributed to all authorized destinations (external TIEs or internal consuming applications), and on the purging policies of the local TIE. The characteristics of the data store are such that the security afforded to the assets is sufficient to propagate the trust chain in the TIE system and enforce asset distribution and or disposition only under the specified or licensed rights.

Metadata repository 116 is a repository to store and search metadata. REL license repository 118 may be implemented as part of the metadata repository 116 handled by the metadata manager. Alternatively, REL license repository 118 can be a physically separate repository. The characteristics of the metadata repository are consistent with those of the data store as the validity of an asset's trust chain depends equally on the security and validity of its associated metadata.

Communication Mechanisms

In the embodiment illustrated in FIG. 1, application servers 122 and 124 are used as the mechanisms through which components access secure data store 112. Specifically, internal producing applications 102 and internal consuming applications 104 access secure data store through application server 122, while external domain gateways 106 and 108 access secure data store 112 through application server 124. In FIG. 1, applications servers 122 and 124 are illustrated as distinct systems. However, a single application server may be used by all entities that interact with the secure data store 112.

In the embodiment illustrated in FIG. 1, the application servers 122 and 124 use different components and/or protocols to communicate with different entities. Specifically, the illustrated application servers 122 and 124 support WS-Security, and include application-to-TIE (A2T), TIE-to-TIE (T2T) and TIE-to-application (T2A) components.

The A2T component is and asset plus metadata collection component. The A2T component includes a application-facing listener and a repository facing server in one embodiment as a web services endpoint and daemon respectively. The A2T component accepts and collects assets transferred by internal producing applications or provisioned by users.

The T2A component is a TIE-to-application asset plus metadata distribution component. The T2A component includes a application-facing listener and or server and a repository-facing listener in one embodiment web services endpoint and daemon respectively. The T2A component accepts assets and metadata transferred by the repository to internal receiving applications or users.

The T2T component is a TIE-to-TIE messaging component that includes the front-end and the back-end. The T2T handles all communications with other TIEs using Web Services Security (WS-S). WS-Security is an open standard that allows developers and vendors to provide secure and interoperable infrastructures for Web Services. The T2T component distributes and accepts metadata carrying licenses and encrypted assets.

Other Components

In addition to the components described above, TIE system 100 includes a variety of other components. For example, TIE system 100 may include a key store 120, a set of rules and policies 130, an audit framework 132, and a user access framework 134.

Key store 120 represents a component that manipulates secure storage for different security keys and other related information. With respect to rules and policies 130, policies are constraints that guide multiple processes, such as filtering processes and license distribution, within a particular agency. Policies are expressed in a written language and are based on guidelines specific to the agency that controls TIE system 100. Rules are algorithmic representations of policies. The rules are used by the agency's TIE to apply policies to TIE processes.

Repository 132 generally represents an audit manager product, such as Oracle's Audit Vault, or a TIE component handling auditing. User access framework 134 is a user management component capable of providing access to different data (assets, metadata, licenses, configuration files, etc.) with different classification levels by users with different levels of clearance.

TIE Components

Figure 2:
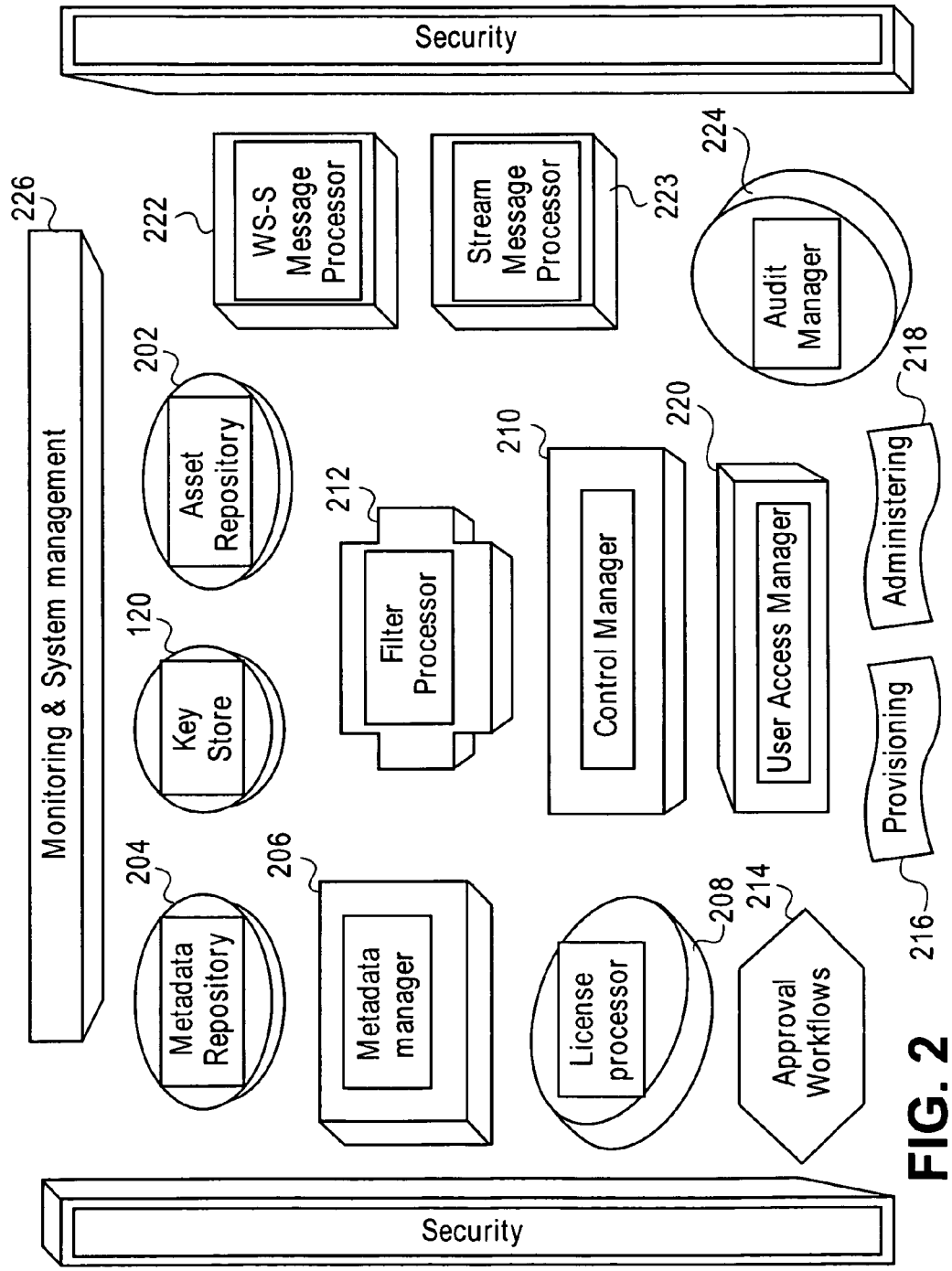
FIG. 2 is a block diagram illustrating various TIE components, according to an embodiment of the invention.

Referring to FIG. 2, it is a block diagram illustrating various TIE components, according to an embodiment of the invention. The components illustrated in FIG. 2 are logical components representing different technology layers, rather than physical components. Each logical component can be implemented as a set of physical components that are not necessarily physically connected to each other. The components illustrated in FIG. 2 include an asset repository 202, a metadata repository 204, a metadata manager 206, a license processor 208, a control manager 210, a filter processor 212, approval workflows 214, a provisioning component 216, an administering component 218, a user access manager 220, a WS-S message processor 222, a Stream message processor 223, an audit manager 224, and a monitoring component 226.

Asset repository 202 provides a storage mechanism for accepted assets. The assets can be stored in their native format or in an encrypted form.

Metadata repository 204 stores asset metadata and subscription subject conditions, and all other types of metadata. According to one embodiment, there are two levels of asset related metadata: asset metadata and subscription subject conditions. The subscription subject conditions describe what kind of assets can be distributed to another, destination agency and/or what kind of assets can be accepted from another, source agency. The asset metadata contains data such as its topic, expiration period, classification level, encryption key, etc. The various types of metadata are described in greater detail hereafter. The metadata manager 206 represents the component that handles access to the metadata repository.

License processor 212 handles REL license generation and validation. The metadata manager 206 invokes the license processor 212. According to one embodiment, the license processor 212 is the only component that knows about the REL license structure and the XML representation of the REL license structure.

The control manager 210 is the component that manages control and data flows in the TIE platform. According to one embodiment, no component other than the control manager 210 has access to the control flow information. Other components are not aware when they are used and just provide the necessary functionality. In order to perform this kind of coordination in a distributed architecture, the control manager 210 is designed to be aware of the current state of each particular TIE Component i.e., the task that the TIE component is currently working on. The control manager 210 gathers the task information and passes the task information to another component by setting off another task in that component.

The metadata manager 206 handles all types of metadata. The metadata manager 206 is fully aware of the whole metadata model and all metadata representations. The metadata manager 206 is invoked by the control manager 210 and processes data (information) passed to the metadata manager 206 in the action context.

Filter Processor 212 determines how "clean" the asset is. Filter processor 212 includes several filter processes that form a pipeline. These filters include malicious code scan, virus scan, dirty word searches, file type validation and other, custom defined filtering actions. The cipher process handles encryption and decryption of the content, if necessary.

Approval workflows 214 are invoked when human assistance, approval and others, is necessary.

Provisioning component 216 is responsible for user provisioning, local application provisioning, external TIE provisioning, subscription subject definitions, workflow approval definitions, local certificate configuration, notification setup, audit setup, etc. Provisioning component 216 produces corresponding metadata that are transferred to the metadata repository. In one embodiment, provisioning component 216 is mostly a UI component, but can be driven by an application.

Administering component 218 handles data and system administration including configuration management and system error handling. Physically, the administering component 218 is similar to the provisioning component 216. Logically, administering component 218 is different, based on user roles that have access to it.

User access manager 220 provides access to users with different levels of authorization (roles) and maps particular user into TIE user roles. The infrastructure might be dealing with two different user roles: general and privileged. Each role has its own hierarchy of authorizations and access rights.

WS-S Message processor 222 is a mechanism for communicating information among participating nodes that might be running on heterogeneous platforms. In the illustrated embodiment, message processor 222 includes a web services component. The TIE network is a complex application that may include distributed components across the network. Hence, the TIE network needs an effective mechanism to pass around licenses and metadata among participating nodes that might be running on heterogeneous platforms. This calls for security, interoperability, and uniform representation of content (assets), its metadata, and licenses when transferred between the nodes.

According to one embodiment, web services provided by message processor 222 are based on several widely accepted standards, including XML (a highly structured universal message exchange format), WSDL (Contractual Service interfaces), SOAP (XML-based transport layer independent protocol for Web Service messaging), and UDDI (Registry for Web Services discovery).

Stream Message processor 223 has the same communication charter as WS-S message processor 222, but is designed to send and receive the encrypted content from other TIEs.

Audit manager 224 generally represents a component for auditing of events performed by the TIE system. Auditing is an after-the-fact record of events and helps create system accountability and support non-repudiation. Auditing also helps customers make periodic reviews of the information exchange activities and assess their impact on the overall security of the system. In one embodiment, audit manager 224 provides a flexible audit framework that can be customized to fit the needs of customers deploying the Trusted Information Exchange system. According to one embodiment, the control manager 210 invokes the audit manager 224 for auditable events that include all repository transactions and send/receive message completions.

According to one embodiment, various components employed by the TIE system include security elements. For example, repository security may be provided by the database server used to manage secure data store 112. Web Services Security may be employed to provide the base for secure TIE front-ends.

The TIE system may also include components to provide provisioning security, auditing security (separate label or separate DB server), and asset security (encryption and decryption, signed digests, etc.), digitally signed licenses with signatures of appropriate principals.

The monitoring component 226 generally represents a collection of sub-components that are responsible for the runtime monitoring, tracking, and querying TIE metadata, messaging, and audit log information. The monitoring component 226 is designated to provide application level insight into the operation of a TIE instance, specific to the TIE system. As some of this information may be sensitive, application level security will be enforced in regards to the interface of the monitoring component 226.

The monitoring component 226 may also include code for performing system management tasks, such as installation, configuration, and re-configuration (or configuration updates), monitoring of component usage (see above) including performance monitoring, and alarm and fault reporting.

Distribution Models

Various distribution models may be used to distribute licenses and assets between TIE-enabled agencies or departments. Some possible distribution models shall be described in detail hereafter, including a one-tier model (use rights, but no redistribution rights), a multi-tier redistributed license/direct asset communication model, a multi-tier pure redistribution, and a pull model. However, these distribution models are merely examples. A single system may combine aspects of these models and/or other models, to accommodate the specific context in which the TIE system is employed.

One-Tier License and Asset Propogation

Figure 3:
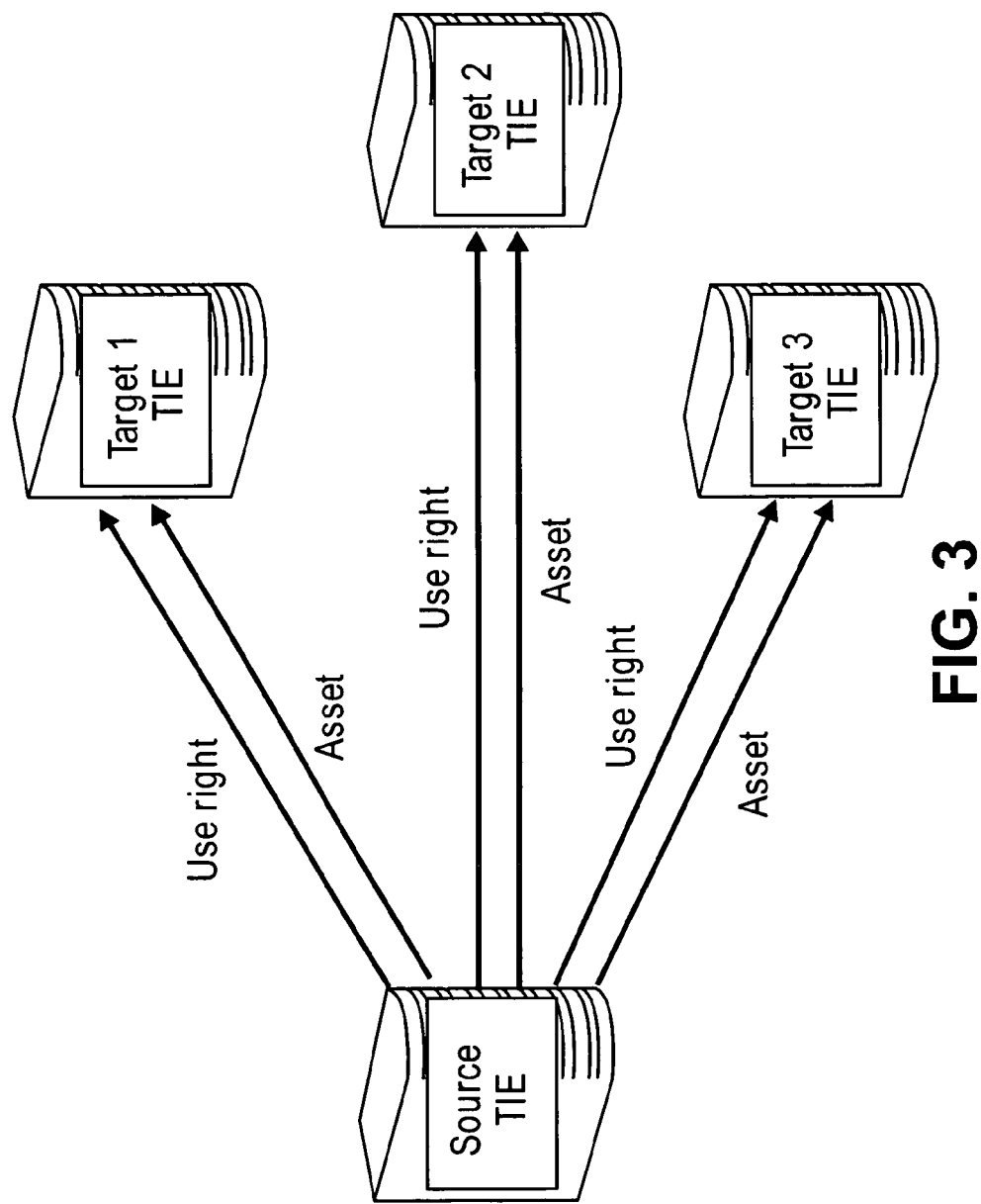
FIG. 3 is a block diagram illustrating TIE systems arranged to exchange information based on a one-tier license and asset propagation model, according to an embodiment of the invention.

Referring to FIG. 3, it is a block diagram illustrating TIE systems arranged to exchange information based on a one-tier license and asset propagation model. In the one-tier license and asset propagation model, one TIE-enabled agency (the "source TIE") serves as both the asset source and the agreement source. The source TIE directly interacts with other TIE-enabled agencies (the "target TIEs") which are, relative to the source TIE, both asset consumers and agreement targets.

In general, the one-tier license and asset propagation model is static in that no new TIE-enabled agency can be added to the distribution flow without the source TIE provisioning it. In the one-tier license and asset propagation model, the distribution of licenses and assets is directly accountable. Specifically, the source TIE directly negotiates license grants with all asset receiving agencies. The source TIE knows at every moment which assets are covered by licenses, and where the assets are distributed. In addition, the identification of assets is local to source TIE. Local asset identification is sufficient for referencing assets in licenses and for auditing and monitoring purposes. In the one-tier license and asset propagation model, the source agency does not delegate to another agency further distribution, for example, to partners of the asset-target TIE agency.

Multi-Tier License and One-Tier Asset Propagation Model

Figure 4:
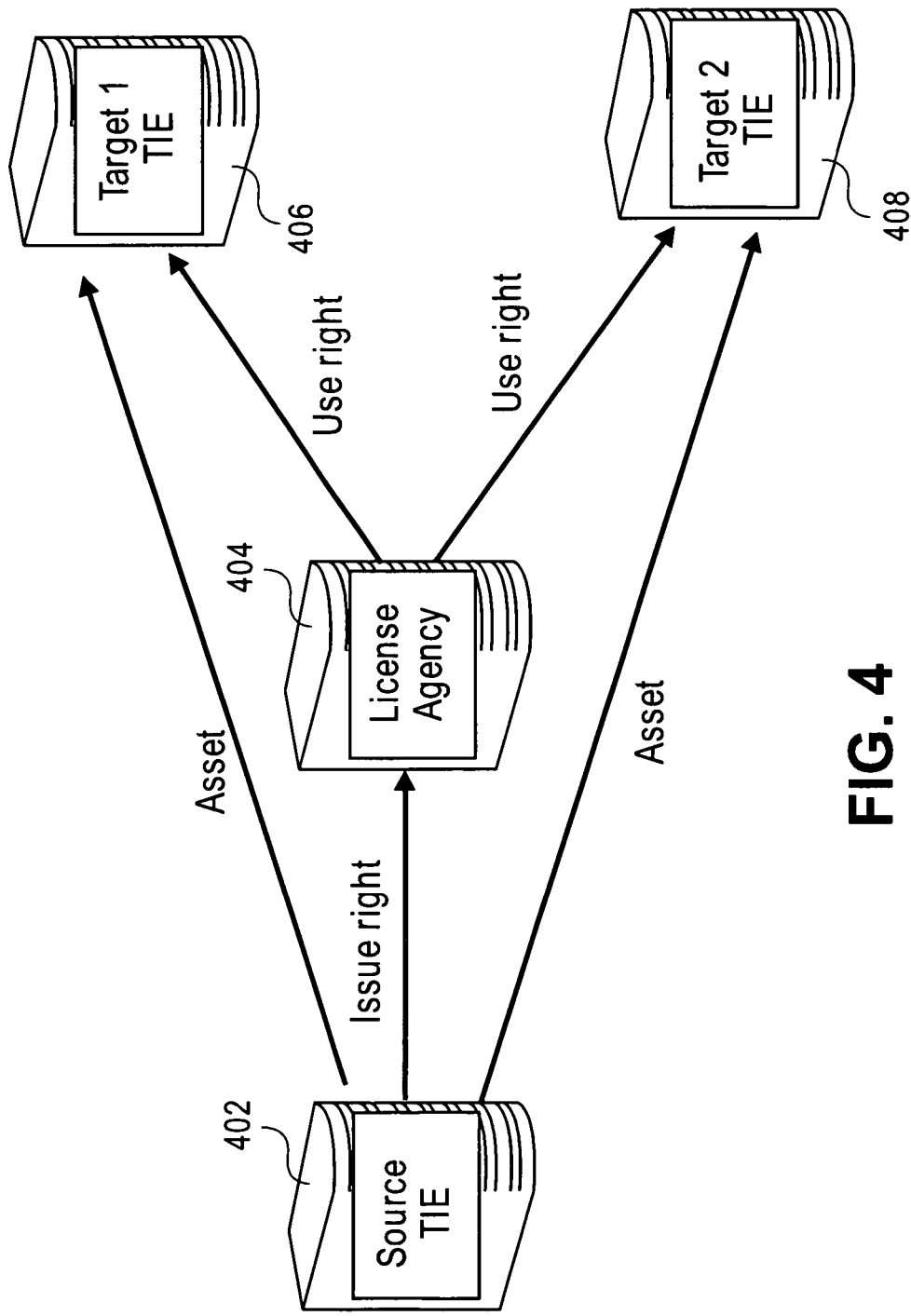
FIG. 4 is a block diagram illustrating TIE systems arranged to exchange information based on a multi-tier trust and one-tier asset propagation model.

Referring to FIG. 4, it is a block diagram illustrating TIE systems arranged to exchange information based on a multi-tier license and one-tier asset propagation model. The multi-tier license and one-tier asset propagation model is more dynamic than the one-tier license and asset propagation model, in that the multi-tier license and one-tier asset propagation model allows the source TIE agency to minimize trust agreement negotiation and license provisioning activities.

In the multi-tier license and one-tier asset propagation model, a source TIE 402 grants via a distribution license to an agency 404 a license to distribute licenses to an asset. The license agency 404 then grants to target TIEs 406 and 408 licenses to use the asset. The target TIEs 406 and 408 obtain the asset directly from the source TIE 402. Thus, the source TIE 402 is the agreement source relative to license agency 404, and license agency 404 is the agreement source relative to target TIEs 406 and 408. In this scenario, license agency 404 may or may not be an asset consumer itself.

In some embodiments, the target TIEs 406 and 408 send their trust confirmations to license agency 404. License agency 404 may then forward the trust confirmations to the source TIE 402. In alternative embodiments, the target TIEs 406 and 408 send their trust confirmations directly to the source TIE 402.

Because the source TIE 402 obtains the trust confirmations from the target TIEs, and provides the assets directly to the target TIEs, all target TIEs (agencies, departments) are still directly accountable to the source TIE 402. Also, the identification of assets local to the source TIE is still sufficient. However, the load of the asset distribution to all involved target TIEs is the same as in the one-tier license and asset propagation model.

Pure License/Asset Redistribution Model

Figure 5:
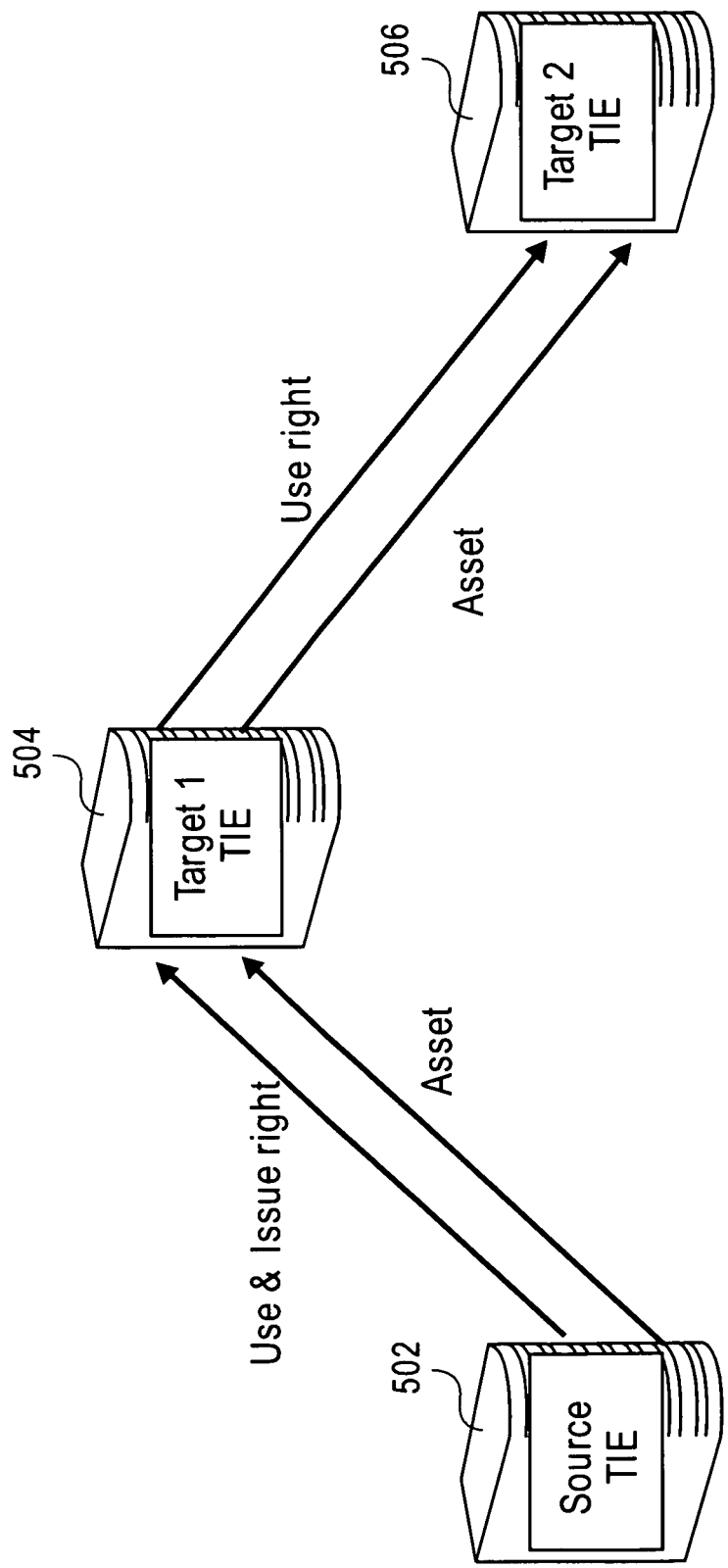
FIG. 5 is a block diagram illustrating TIE systems arranged to exchange information based on a pure redistribution model.

Referring to FIG. 5, it is a block diagram illustrating TIE systems arranged to exchange information based on a pure redistribution model. The pure redistribution model is fully dynamic in that target TIES may be added to the distribution stream without involving the source TIE 502 assuming that the redistribution license conditions are met. In the pure distribution model, the source TIE is the asset source and agreement source relative to some target TIEs. However, those target TIEs may serve as both the asset source and agreement source relative to other target TIEs. In order the support trust chaining, the distributor acts more as a proxy for the asset source. Thus, while the Target TIEs see the Distributor as the agreement source, the actual agreement is still owned by the asset source. This is the Grant "nesting" in the REL license.

In the embodiment illustrated in FIG. 5, source TIE 502 is the agreement source and asset source relative to target TIE 504. Target TIE 504, in turn, is the agreement source and asset source relative to target TIE 506.

In the pure redistribution model, the load of license and asset distribution on source TIE can be minimized. Further, in one embodiment the source TIE does not have to keep information about all TIEs involved and about all transactions with them. On the other hand, in the case where non-repudiation across the trust chain is desired, the source TIE would receive all transaction records.

However, in the pure redistribution model, the identification of assets based on unique, local-to-source TIE identifiers is not sufficient any more. A more sophisticated identification model is required. In addition, the pure redistribution model may require a more sophisticated auditing model than the models described previously in that TIE-to-TIE back channel information on transactions needs to be supported.

The Pull Model

The subscription model may be used in conjunction with any of the models described above. However, unlike the scenarios presented in those models, the asset source does not proactively "push" assets covered by the license to the asset consumers in a single asset license exchange. Instead, the subscription licenses convey the right to query the asset source for certain assets. When the asset source receives a query from a licensed consumer, the asset source takes the scope of the license into account when answering the query. For example, the asset source may restrict answers to queries to content covered by trust agreement. Alternatively, queries may denied when results would include assets that are not licensed.

For example, assume that an asset source maintains a database of phone numbers. Assume that the license negotiated with one asset consumer only allows the asset consumer to view phone numbers in a particular area code. If that consumer submits a query to retrieve all phone numbers of a city that includes several area codes, the asset source may either (1) deny the query, or (2) provide only those numbers, within the specified city, that are in the area code covered by the license.

Trust Agreements Implemented Using Rights Expression Language

According to one embodiment, trust agreement negotiations between each agreement source and agreement target are conducted by exchanging information formatted according to the Rights Expression Language (REL). The Rights Expression Language is an ISO standard (ISO-MPEG-21/5) language that allows asset sources and their authorized distributors to express the rights and conditions under which an entity can use/distribute digital content. REL uses standards-based encryption (XML-Enc), Digital Signatures (XML-DSig) and authentication within its XML syntax.

The MPEG Rights Expression Language (REL) defines a machine readable, XML-based language for expressing rights. The REL framework for creating precise, reliable, and secure licenses for content makes the language particularly useful for a scalable peer-to-peer trusted information exchange management (TIE) system.

MPEG REL can be used to create licenses that address a wide variety of business models. The MPEG REL is designed to be domain agnostic and comprehensive. REL is also very flexible, and adaptive to the specific scope and requirements of applications within a particular domain. Specifically, the REL provides extension and profile mechanisms for these purposes.

Rel License Basics

Figure 6:
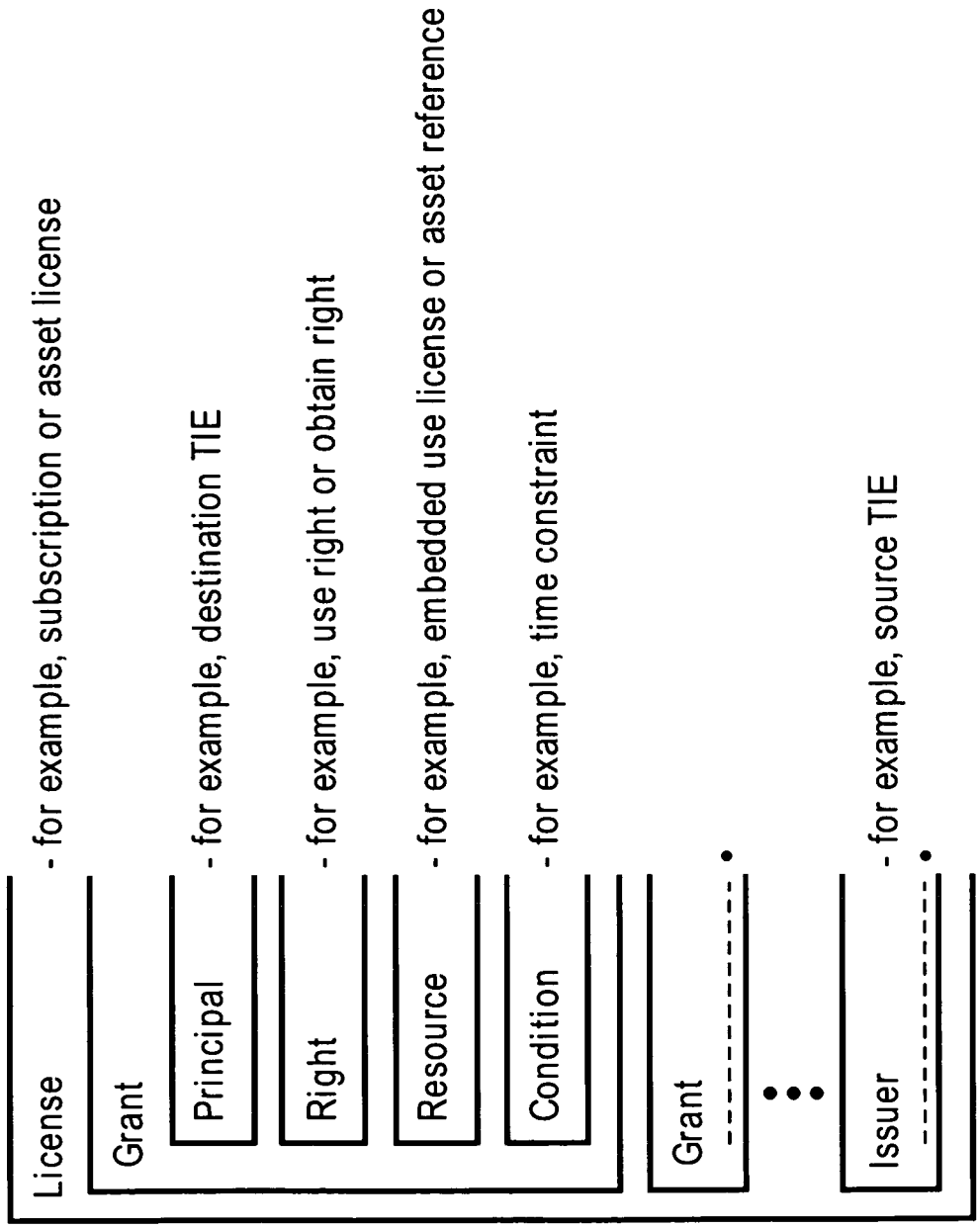
FIG. 6 illustrates the basic elements of a REL license.

Referring to FIG. 6, it illustrates the basic elements of a REL license. These basic elements, as well as others, are described in ISO/IEC 21000-5, Information Technology—Multimedia Framework (MPEG-21), Part 5, Rights Expression Language. REL licenses typically include the following basic elements:

License—is the basic construct of REL. The license conveys all the necessary authorizations or grants for the use and/or distribution of the content, or asset.

Grant—is the element within a License grants a Principal, to whom the Grant is issued, a Right for a certain action in regard to a Resource under a certain Condition that must be met before the Right is exercised.

Principal—presents the identity of a party to whom rights are granted subject to certain conditions by an issuer.

Resource—is the object to which a Principal can be granted a Right. It can also be an embedded grant.

Right—is a verb, or action, that a Principal can be granted to exercise on a Resource under certain conditions.

Condition—specifies the terms, conditions and obligations under which Rights can be exercised Issuer—identifies a Principal who issues the rights to a certain party subject to certain conditions.

Rel License Profiles and Extensions

The MPEG REL is designed to be domain-agnostic and comprehensive. REL is also very flexible and adaptive to the specific scope and requirements of applications within a particular domain. Specifically, the language provides extension and profile mechanisms for these purposes.

From the extensibility point of view, MPREG REL has three architectural parts. The core, standard extension, and multimedia extension, as well as their XML Schemas, are normative parts of the overall MPEG REL specification. Other parties may, if they wish, define their own (possibly domain-specific) extensions to the MPEG. This is accomplished using the existing, standard XML Schema and XML Namespace mechanisms.

Just as an application domain may need to develop its own MPEG REL extension to capture its own domain-specific elements (e.g. rights, resources and conditions), it may also wish to identify a conforming subset of the MPEG REL to meet its specific needs in order to facilitate compliance and interoperability among its applications and systems. This is where profiles come into the picture.

The profile specifies a particular use of the base REL standard in order to meet specific needs in an optimized yet interoperable way of a particular community (e.g. the Trusted Information Exchange community). Thus, the profile provides a specification to build interoperable special-purpose systems, as well as providing a standard reference for profile compliant system. Different profiles may be developed to achieve different objectives.

REL includes a predefined set of expressions (signed by, expiration date, etc.) for performing the authorization needed to execute a trusted exchange of a digital asset. Further, REL can be extended to support domain-specific methods of authorization. Such domain-specific extensions may be implemented as standard extensions, or non-standard extensions, to the core REL structure.

Trusted Information Exchange Licenses

In one embodiment, Trusted Information Exchange (TIE) functionality uses several kinds of licenses. These licenses are defined as per the REL schema with certain domain-specific extensions. These extensions are different for different domains. For example, for some government-related domains, topic and classification specification are required. The basic set of licenses supported by TIE systems include confirmation license, asset usage license, asset distribution license, subscription license, and subscription termination license.

Confirmation License

The confirmation license is used to confirm identities of communicating TIE systems and their configuration. The actual identification of principals and exchange of certificates typically happen through "out of band" processes, outside of TIE framework.

According to one embodiment, the asset source sends to the destination TIE a confirmation license, which contains destination TIE public key and identification information. This communication acts as an electronic confirmation of a general agreement to distribute assets (information items) to the destination TIE by the asset source. It may also include operational configuration conditions and/or constraints to be confirmed. Validating, signing and returning the confirmation license by the destination TIE completes this communication.

Asset Usage Licenses

The asset usage license is a license that communicates metadata associated with the asset, the asset owner, the authorized users, the scope of use and the conditions constraining each. According to one embodiment, an asset usage license has the following structure:

```
<license>
    <grant>
        <principal>
            <keyHolder LicensePartId="Destination TIE Id">
                <info><dsig:KeyValue> ....</dsig:KeyValue></info>
            </keyHolder>
        </principal>
        <use/>
        <digitalResource>
            ...Asset Id
        </digitalResource>
        <expiration>
            ...Expiration date and time
        </expiration>
        <assetMetadata>
            ...Asset metadata
        </assetMetadata>
    </grant>
    <issuer>
        <keyHolder LicensePartId="Asset source Id">
            <info><dsig:KeyValue> ....</dsig:KeyValue></info>
        </keyHolder>
    </issuer>
</license>
```

Asset Distribution License

Similar to an asset usage license, an asset distribution license also communicates metadata associated with the asset. However, in one embodiment, the "right" and "resource" sections are different than those sections of an asset usage license in that the "right" is to distribute assets and/or their licenses to users that have an in scope trust relationship with the distribution license recipient. For example, in one embodiment, the asset distribution license has the following structure:

```
<license>
    <grant>
        <principal>
            <keyHolder LicensePartId="Destination TIE
                Id">...</keyHolder>
        </principal>
        <issue/>
        <digitalResource>
            ...Asset usage grant - (see above)
        </digitalResource>
        <expiration>
            ...Expiration date and time
        </expiration>
    </grant>
    <issuer>
        <keyHolder LicensePartId="Asset source Id">
            <info><dsig:KeyValue> ....</dsig:KeyValue></info>
        </keyHolder>
    </issuer>
</license>
```

Subscription License

A subscription license defines a set of conditions over the subscription vocabulary. Sets of conditions can be provisioned separately, during internal application provisioning, or during destination or asset source provisioning.

The subscription license communicates to a particular destination TIE system the set of constraints (conditions) that will be applied to the metadata of assets distributed to the TIE. Each condition can be as simple as a name-value pair, for example, topic=emergency. Alternatively, conditions can be more complex, for example, specifying a time limit for asset requests after the license for this asset has been issued. The set of conditions can be specific for a particular destination TIE or a group of destination TIEs, or it can be defined for all destination TIEs Where an asset license communicates metadata associated with the asset, a subscription license may communicate constraints, conditions, on asset metadata for a particular subscription subject.

In one embodiment, subscription licenses have the following structure:

```
<license>
    <grant>
        <principal>
            <keyHolder LicensePartId="Destination TIE
                Id">...</keyHolder>
        </principal>
        <obtain/>
        <digitalResource>
            ...Asset usage or distribution grant with variables
            and constraints.
        </digitalResource>
```

-continued

```
        <expiration>
            ...Expiration date and time
        </expiration>
    </grant>
    <issuer>
        <keyHolder LicensePartId="Asset source Id">
            <info><dsig:KeyValue> ....</dsig:KeyValue></info>
        </keyHolder>
    </issuer>
</license>
```

Variables represent such missing parts as Asset Id, expiration data and time, etc.

Subscription Terminated License

A subscription termination license is a license that communicates to the destination TIE system that this asset source system will send no more assets qualifying for the subscription.

Sample License Mediation

When a TIE system is used to exchange digital information, licenses must be both generated and consumed. The process of generating and consuming licenses involves validating both the structure of the license as well as its types and the operational semantics that the license may represent. A key element of this mediation is the authentication capability afforded by the inclusion of both the agreement source's and the agreement target's digital identity. The inclusion of these digital identities along with the apriori delivery of respective digital certificates allows for PKI-based bi-lateral authentication without a central root of trust or trust authority. This trust model can also be "chained" through the use of the distribution licenses previously described.

Figure 7:
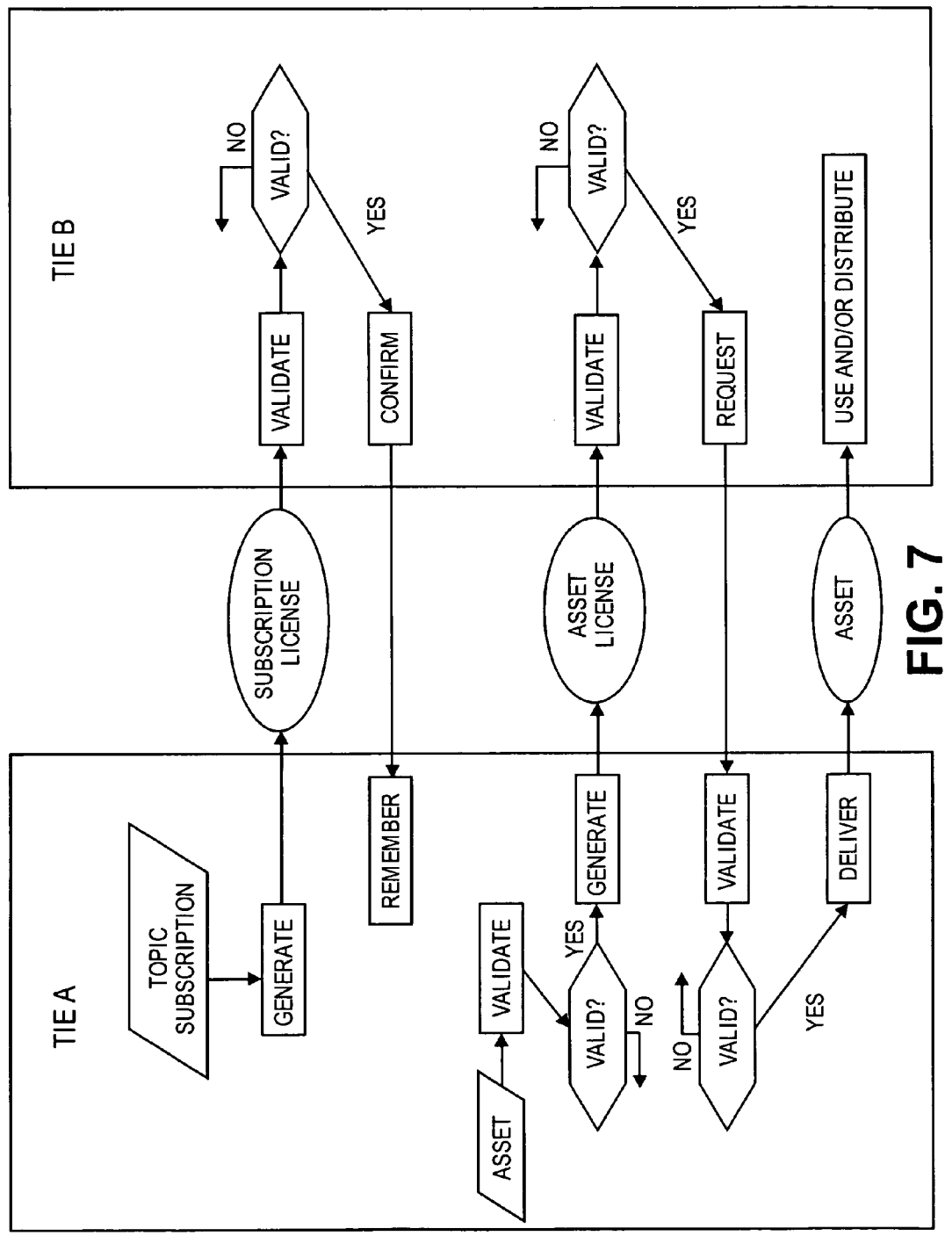
FIG. 7 represents a sample flow starting from confirmation license generation and ending with an asset being distributed.

FIG. 7 represents a sample flow starting from subscription license generation and ending with an asset being distributed. The Confirmation License flow is a one-time provisioning action that is not represented. The flow illustrated in FIG. 7 is only an example; real flows can significantly more complex.

Referring to FIG. 7, an agreement source (TIE A) generates a subscription license based on a topic subscription. An agreement target (TIE B) validates the subscription license which includes authenticating the agreement source. If the subscription license if not valid, it is rejected. If the subscription license is valid, then TIE B sends a trust confirmation to TIE A to confirm acceptance of the license and the terms within.

When TIE A collects an asset and its associated metadata that falls under the terms of the license, TIE A validates the asset. If the asset is valid, TIE A creates an asset license and sends it to TIE B. TIE B authenticates and validates the asset license, and sends a signed message to TIE A, which could be the asset license itself, confirming acceptance of the asset license and thereby requesting delivery of the asset. TIE A authenticates and validates the request, and sends the asset to TIE B for use and/or redistribution (depending on the nature of the license).

Metadata Model

Metadata is information associated with an information element, or digital asset, such as text file, or a video clip, or a geo-spatial image, or an entity in the information exchange environment such as a source or destination TIE or an internal, source or destination application. The metadata usually, in such cases, takes the form of a set of attribute value pairs. Another category of metadata is information (describing data) associated with information (topic) subscriptions such as a subscription for information items (assets) about (topic) 'missing' with the classification level of 'secret'. Finally, metadata can be operational and transaction data such as send and receiver timestamps, IP addresses, etc.

Figure 8:
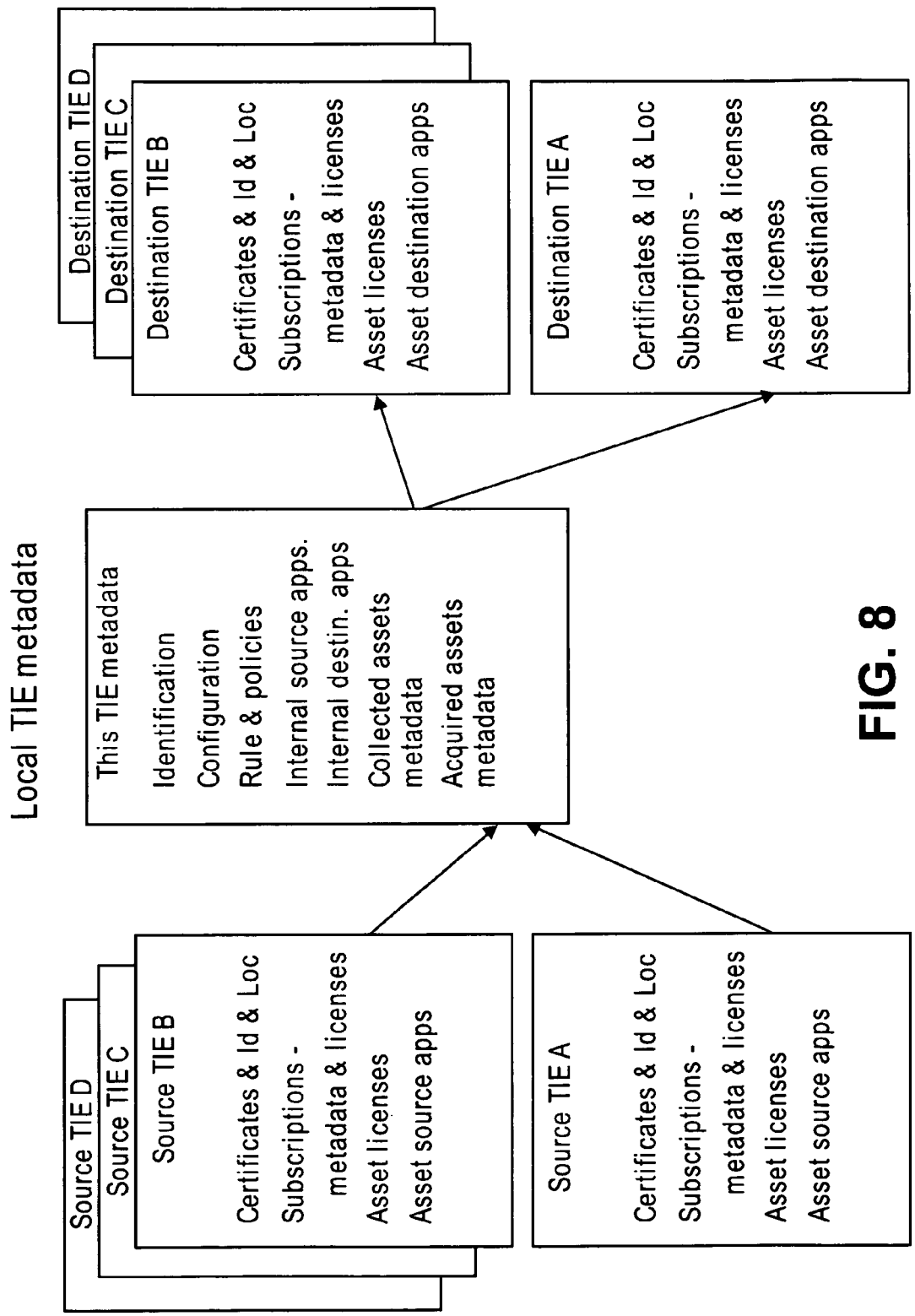
FIG. 8 is a block diagram illustrating TIE metadata categories, according to one embodiment of the invention.

FIG. 8 is a block diagram illustrating TIE metadata categories, according to one embodiment of the invention. The metadata used by TIE components, the metadata used for the communication between TIE components, and the metadata used for communication between TIE systems, shall be described in greater detail hereafter.

According to one embodiment, metadata manager 206 is the only component that interacts with the repository to access the TIE metadata. The control manager 210 interfaces with the metadata manager 206 to access metadata information. All other TIE components get the required metadata from the metadata manager 206 through the control manager 210.

Metadata Classification

The TIE vocabulary defines a set of terms, or metadata elements, together with their data types and possibly additional constraints. This vocabulary consists of a domain specific vocabulary that will vary from domain to domain (DoD vs. Health Care), core (generic) vocabulary that is common to all domains, and a set of (source) application, or just source, vocabularies. Terms from the core vocabulary are referred to herein as "core terms", or core (metadata) elements. Terms from the domain specific vocabulary are referred to herein as "domain terms", or domain (metadata) elements. Terms from (source) application vocabularies are referred to herein as "source terms", or source (metadata) elements. The core vocabulary is extensible.

Both core and domain elements fall into the following groups, or sub-vocabularies:
  TIE identification metadata (per local TIE)
  Asset source (start point) metadata (per start point, or internal source application)
  Asset destination (end point) metadata (per end point, or internal destination application)
  Asset metadata (per asset)
  Acquired asset license metadata (per license+asset source)
  Metadata about acquired asset licenses (per license+asset source)
  Acquired subscription license metadata (per license+asset source)
  Metadata about acquired subscription licenses (per license+asset source)
  Distributed asset license metadata (per license+destination TIE)
  Metadata about distributed asset licenses (per license+destination TIE)
  Distributed subscription license metadata (per license+destination TIE)
  Metadata about distributed subscription licenses (per license+destination TIE)
  Source and destination TIEs metadata Asset source metadata includes information about the asset submitted to the asset source by the internal source end points. Asset destination metadata is transferred to the destination end points.

A subscription defines a set of conditions over the TIE vocabulary. Each condition can be as simple as a name-value pair or more complex, for example, specifying a time limit for asset requests after the license for this asset has been issued.

The set of conditions can be specific for a particular destination TIE or a group of destination TIEs, or it can be defined for all destination TIEs.

With respect to subscription provisioning, sets of conditions for each subscription type can be provisioned separately, during internal application provisioning, or during destination or asset source provisioning.

The subscription license communicates to a particular destination TIE the set of constraints that will be applied to the metadata of assets distributed to this TIE. As mentioned above, an asset license communicates metadata associated with the asset, while a subscription license communicates constraints, conditions, on asset metadata for a particular subscription subject. The subscription confirmation (acceptance) confirms asset flow conditions are configured and agreed to.

The asset license communicates the rights for the asset use and/or distribution. Asset license (acceptance) confirmation is a part of the confirmation/tracking flow.

The asset license is validated based on the template license embedded in the subscription license. The metadata validation is the basic underlying mechanism for the license and other information validation.

Metadata Model

Figure 9:
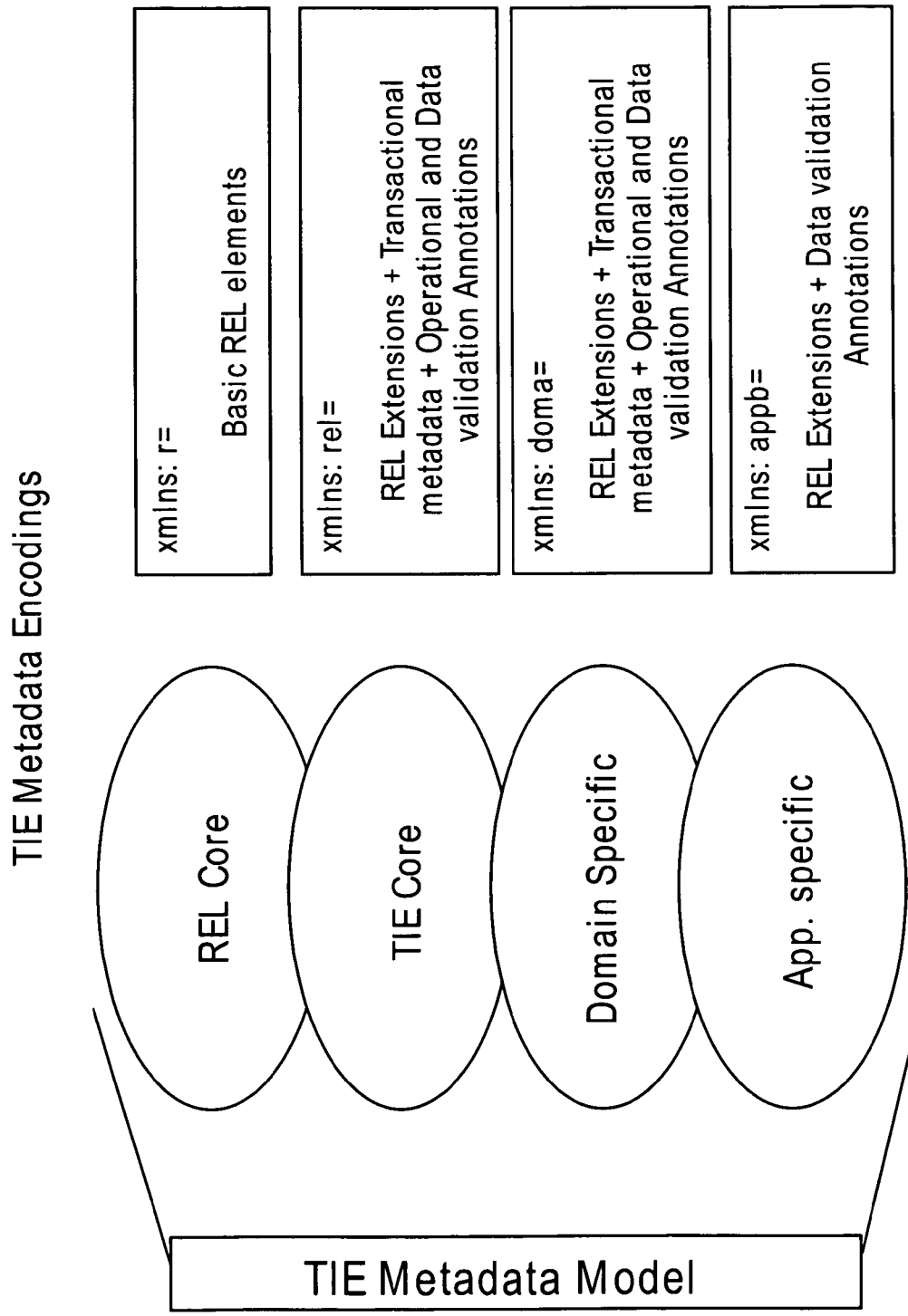
FIG. 9 is a block diagram that represents the metadata model used by a TIE system, according to one embodiment.

As explained above, the full set of metadata elements (terms in the TIE vocabulary) includes core elements, domain (specific) elements, and (source) application, or just source, elements. FIG. 9 is a block diagram that represents the metadata model used by a TIE system, according to one embodiment.

According to one embodiment, each element, or term, has the following characteristics associate with it:
Name
Description
Data type
Data validation constraint(s). For example, a combination of classification and origin network values could be valid or invalid combination. Value constraints also can be fixed or domain specific.
Operational semantics. These semantics are associated with different validation points. For example, filtering an asset can lead to the asset acceptance or rejection. Semantics of core elements are either fixed or domain specific. Semantics of domain elements are always domain specific.
Semantics define actions: validation, component actions, AQ (queue), trigger, approval, and notification. Sets of elements include:
A—Internal source to TIE and a part of asset license
B—Internal source to TIE and not a part of the asset license
C—A part of the asset license, but different from A and B.
ACD—Subset of A combined with C included in metadata sent to the destination.
E—Additional elements that are sent to the destination, but not included in A or C
F—TIE specific metadata
In one embodiment, constraint groups are associated with:
Each validation
Each provisioning task
Each internal source and destination
Each source and destination TIE

Control and Data Flows

The ways in which TIE systems can be used to facilitate the exchange of information are virtually unlimited. The specific flow of messages used to facilitate the information exchange will vary from situation to situation. Various work flow examples shall be described hereafter. However, how a TIE system is used to facilitate information exchange is not limited to the control and data flows described in the following examples.

Subscription License Flows

A "subscription" may be represented by a set of name-value pairs, where names are terms in a subscription vocabulary, and values represent values of data types associated with corresponding terms in this vocabulary.

Figure 10:
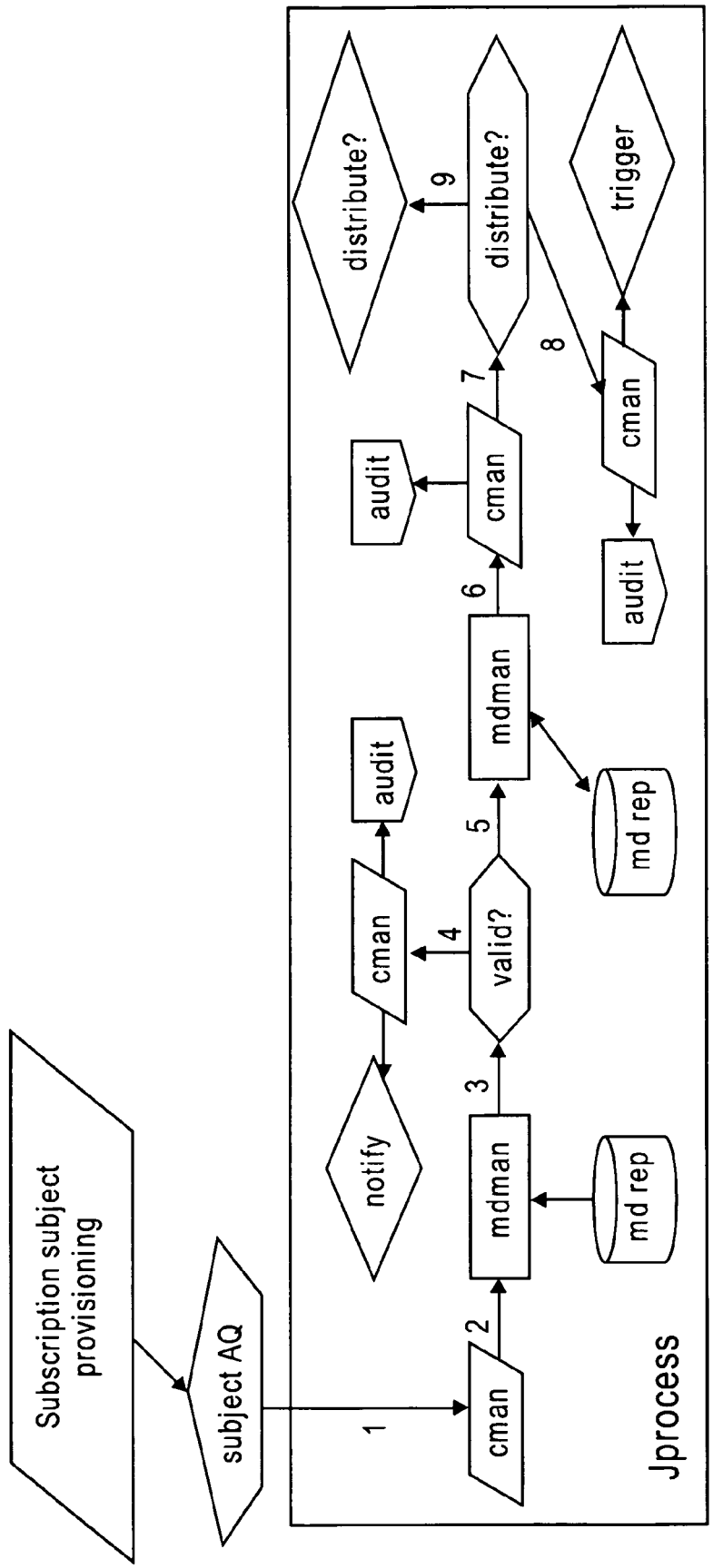
FIG. 10 is a flowchart illustrating the control and data flow in a subscription subject provisioning scenario, according to one embodiment.

In a subscription subject provisioning scenario, a set of conditions are defined over the subscription vocabulary. FIG. 10 is a flowchart illustrating the control and data flow in a subscription subject provisioning scenario, according to one embodiment. The flow sequence is as follows:
1. The subscription subject (topic, classification, etc.) is provisioned and transferred to the Control manager.
2. The Metadata manager is called to check rules (policies), if any.
3. Is it valid?
4. No, it is not. Audit and notify an appropriate person or application
5. Yes, it is valid. Record subscription metadata in the repository.
6. Audit.
7. Should the subscription license be distributed now?
8. No, audit and set a trigger to initiate the distribution later.
9. Yes, proceed to distribute.

In a subscription license distribution scenario, the subscription license communicates to a particular destination TIE the set of constraints that will be applied to the metadata of assets distributed to this TIE.

Figure 11:
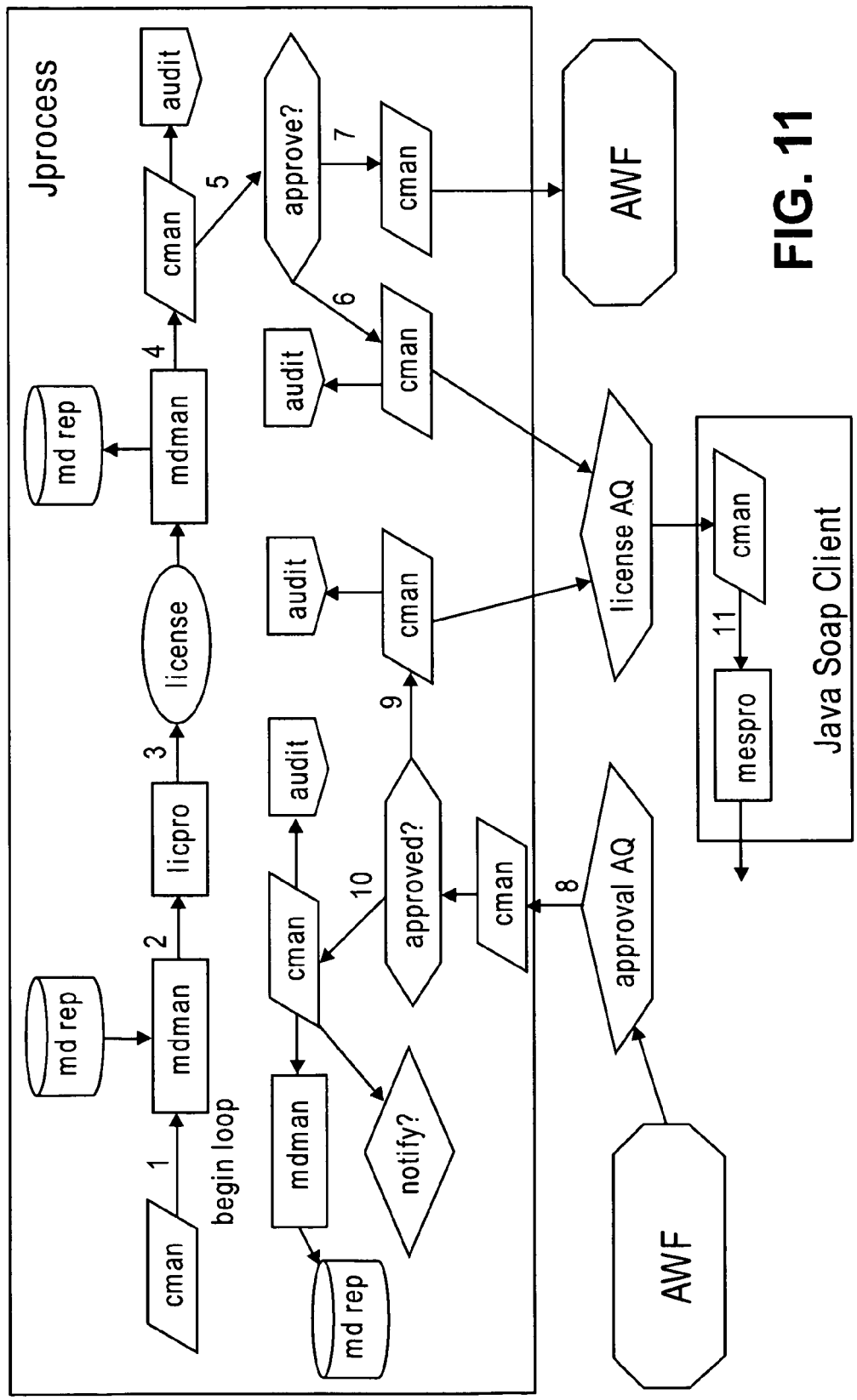
FIG. 11 is a flowchart illustrating the control and data flow in a subscription license distribution scenario, according to one embodiment.

FIG. 11 is a flowchart illustrating the control and data flow in a subscription license distribution scenario, according to one embodiment. The flow sequence is as follows:
1. Start generating licenses to all appropriate destination TIEs that are determined based on subscription licenses issued to different destination TIEs. Prepare license metadata for the license processor.
2. Generate the license
3. Save the license and selected metadata for future queries
4. Audit.
5. Check rules (policies), if any, whether an approval workflow is required
6. No, it is not required. Add the request to send this license to the designated TIE
7. Yes, it is required. Initiate the workflow process.
8. Is it approved?
9. Yes, it is approved. Audit. Add the request to send this license to the designated TIE
10. No, it is not approved. Audit. Remove license metadata. Send notification to an appropriate person or application.
11. Send the license to the destination TIE. Wait for a synchronous response.

Figure 12:
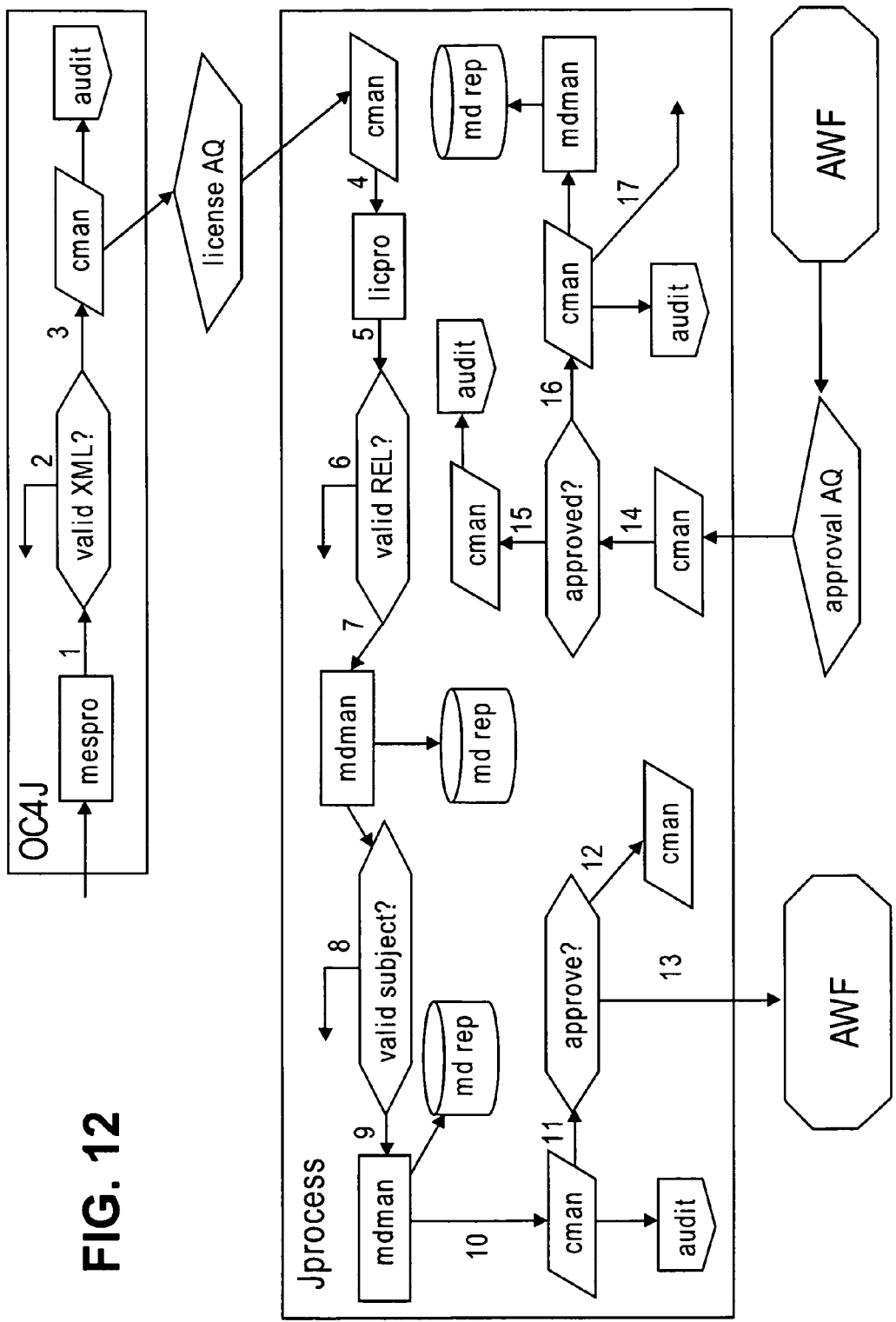
FIG. 12 is a flowchart illustrating the control and data flow for subscription license processing and validation, according to one embodiment.

FIG. 12 is a flowchart illustrating the control and data flow for subscription license processing and validation, according to one embodiment. The flow sequence is as follows:
1. Was message accepted as a valid (syntax) message?
2. No, it was not valid. Or a time out happened.
3. Yes, it is a valid message syntactically. Audit. Add it to the queue for processing
4. Validate REL specific semantics (extensions) and authenticate signatures 5. Is it valid?
6. No, sign and send an asynchronous rejection.
7. Yes. Store in the metadata repository and subscription subject semantics whether it is valid.
8. No, it is not. Sign and send an asynchronous rejection.
9. Yes, record it in the metadata repository.
10. Audit
11. Does it need an approval?
12. No. Queue for asynchronous response.
13. Yes, send for an approval.
14. Is it approved?
15. Yes, audit and queue for asynchronous response
16. No, audit and remove subscription metadata from the repository
17. Sign and send an asynchronous rejection.

Figure 13:
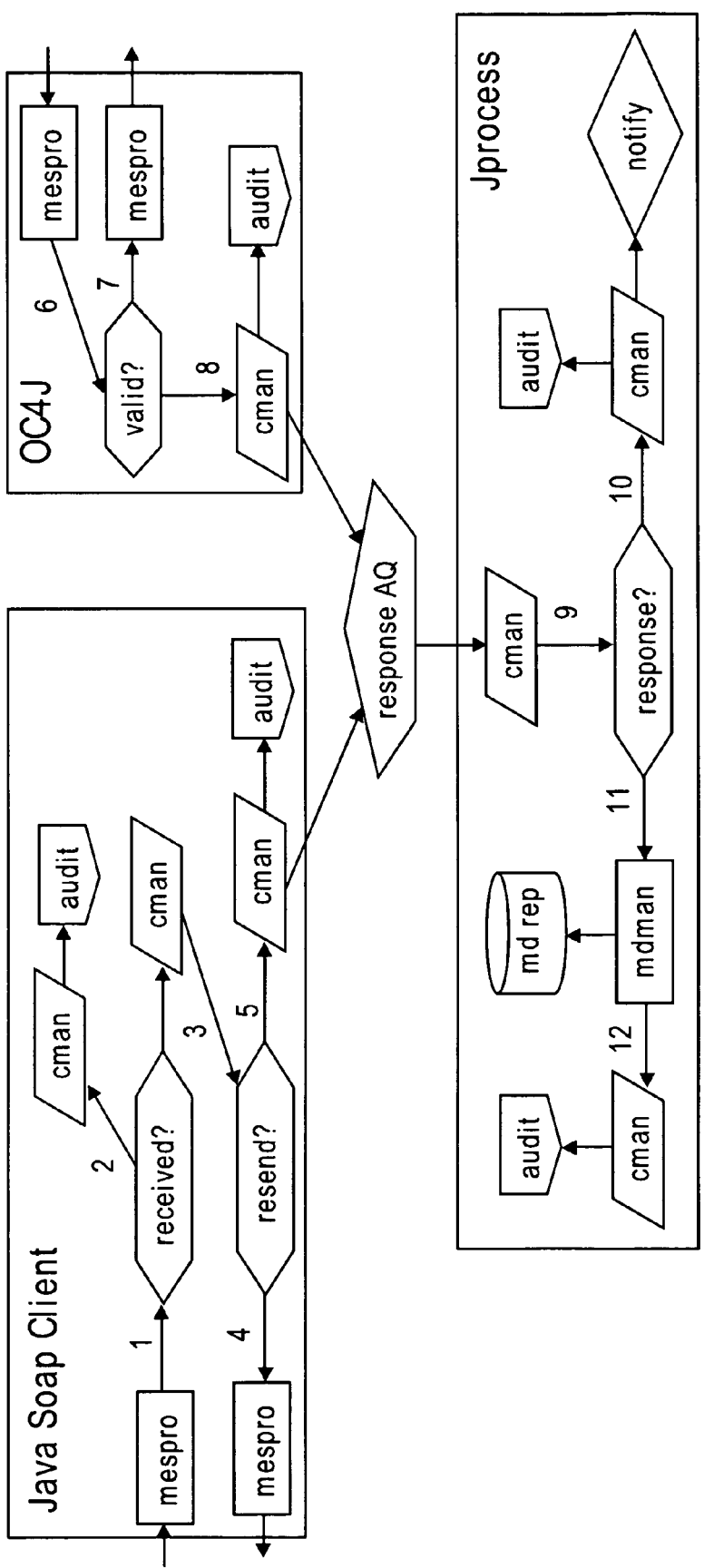
FIG. 13 is a flowchart illustrating the control and data flow for a subscription license distribution response, according to one embodiment.
Figure 14:
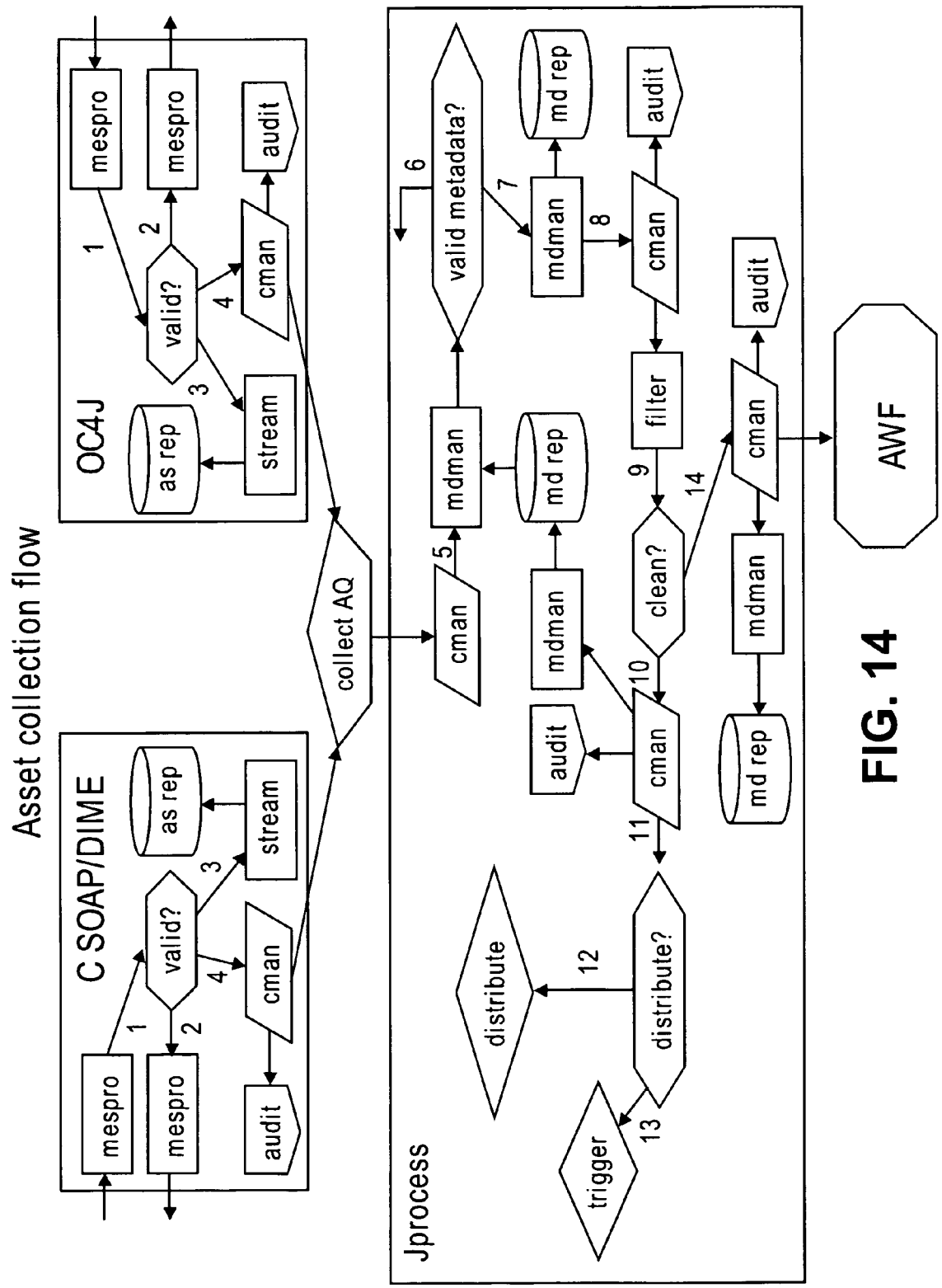
FIG. 14 is a flowchart illustrating an asset collection flow, according to one embodiment.

FIG. 13 is a flowchart illustrating the control and data flow for a subscription license distribution response, according to one embodiment. The flow sequence is as follows:
1. Receive a synchronous response. Was it correctly (syntactically) received? Or timed out?
2. Yes, it was received. Audit. Stop
3. No, should it to be resend?
4. Resend the message.
5. No, it should not be resend. Audit. Add to the response queue
6. Receive an asynchronous response. Is it a valid and authenticated message?
7. No. Send 'invalid' message back.
8. Yes. Audit and add the response to the response queue for processing.
9. Was it accepted?
10. No, audit and notify an appropriate person or application. In the case of a positive response such notification might not be necessary.
11. Yes, record it in the repository
12. Audit and stop Asset Collection and Distribution Flows In many situations, assets need to be collected before the assets can be distributed as part of an information exchange. FIG. 14 is a flowchart illustrating an asset collection flow, according to one embodiment. The flow sequence is as follows:
1. The Message manager receives a message with an asset and checks if XML/SOAP syntax is valid.
2. No, it is not valid; do not accept the asset; send 'reject' message.
3. Yes, message is valid. Stream the asset to the temporary store and get temporary store's asset Id (aloc).
4. Transfer parameters and asset's aloc to the Control manager. Audit and place the request for processing in the queue.
5. The metadata manager determines if the asset metadata are valid?
6. Parameters are not valid. Send a rejection response.
7. Yes, they are valid. Create metadata and an asset Id.
8. Audit and invoke the filtering process.
9. Is it clean?
10. Yes, it is clean. Update metadata, audit and move the asset from the temporary repository to regular asset repository
11. Distribute asset's license now or later?
12. Distribute now
13. No, set the trigger (for example, based on the embargo date).
14. It is not clean. Activate the approval workflow.

Figure 15:
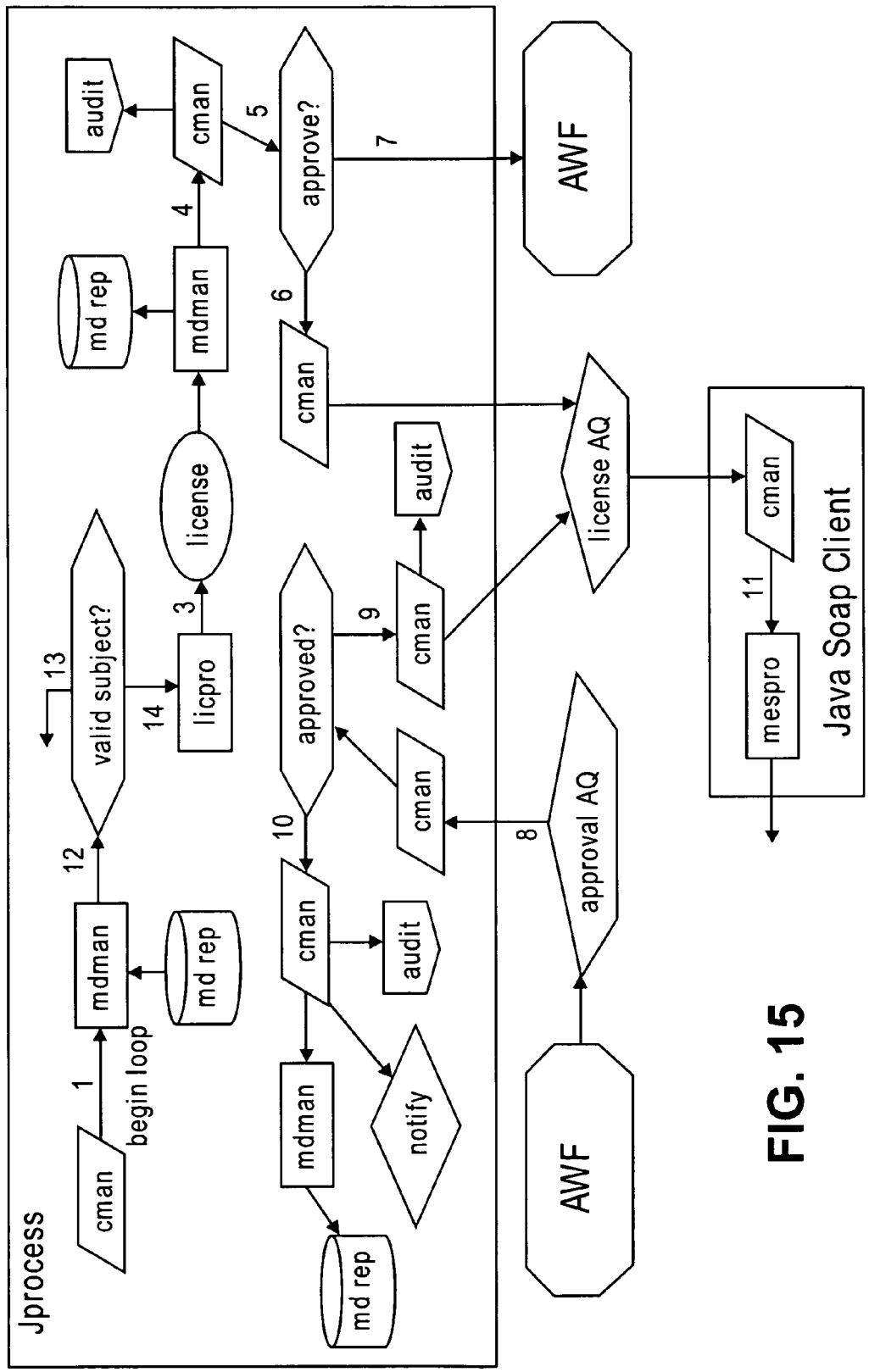
FIG. 15 is a flowchart illustrating an asset license distribution flow, according to one embodiment.

FIG. 15 is a flowchart illustrating an asset license distribution flow, according to one embodiment. The asset license distribution flow is almost identical to the subscription license distribution flow. However, the asset metadata are evaluated against subscription conditions for every destination TIE.

The difference between the flow illustrated in FIG. 15 and the flow illustrated in FIG. 11 is that asset metadata evaluation against subscription subject conditions is added. Specifically, in the list of actions, item 2 is replaced with the following items:
12. Evaluate the asset metadata against the destination TIE specific subscription subject conditions. Is it valid, so that the license can be generated for this destination TIE?
13. No; skip this TIE; go to the next one.
14. Yes, generate the license.

Figure 16:
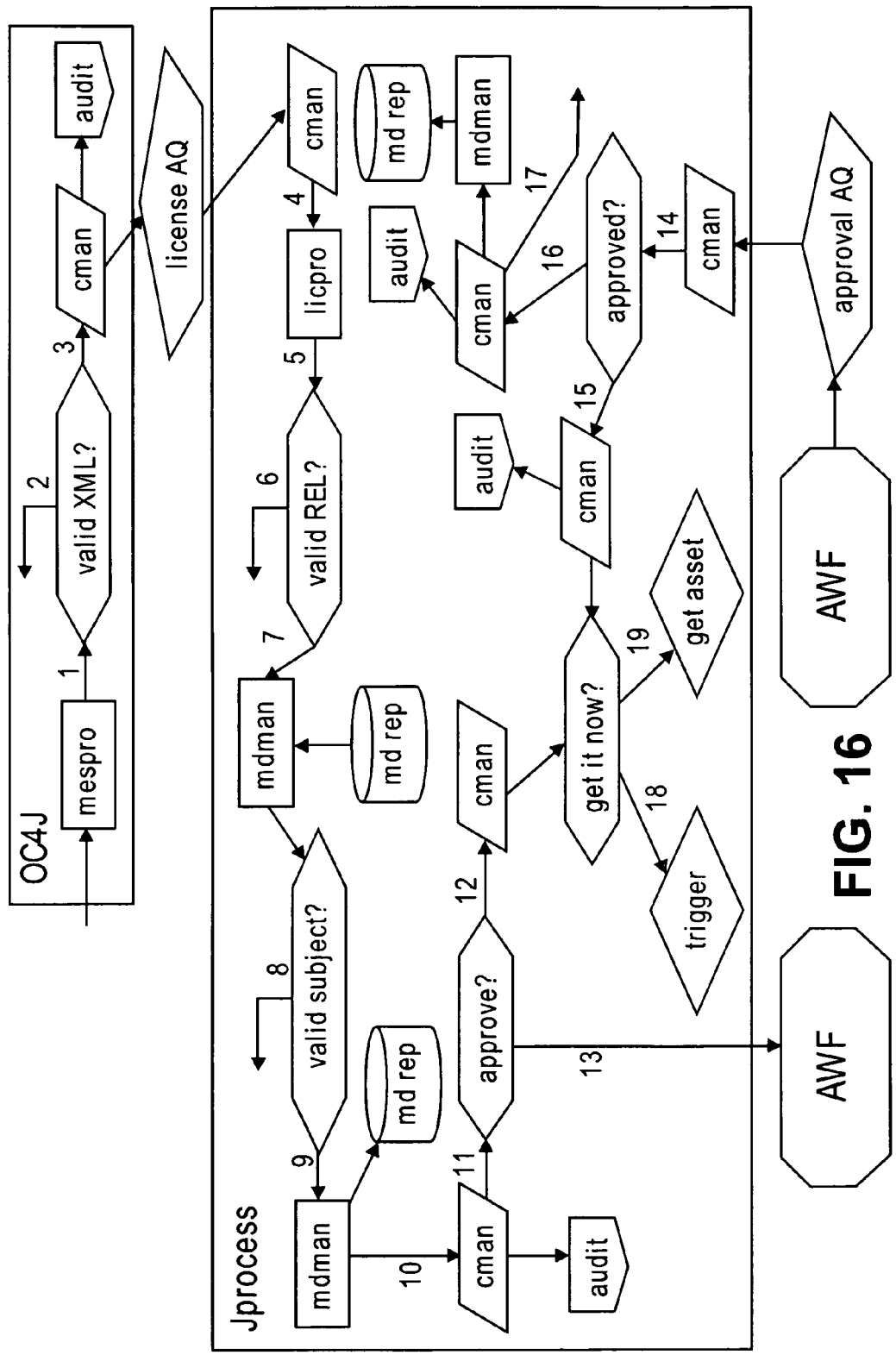
FIG. 16 is a flowchart illustrating an asset license processing and validation flow, according to an embodiment.

FIG. 16 is a flowchart illustrating an asset license processing and validation flow, according to an embodiment. The difference between the flows illustrated in FIG. 16 and FIG. 12 is that, under item 8, conditions on asset license metadata are evaluated rather than conditions on subscription license metadata, and that at the end it is evaluated whether the asset should be requested immediately or a trigger should be set to request it later.
18. No, do not request it now. Set a trigger (for example, based on TIE specific rules for this particular subscription subject).
19. Yes, request the asset now According to one embodiment, an asset license distribution response flow is identical to the flow illustrated in FIG. 13.

Figure 17:
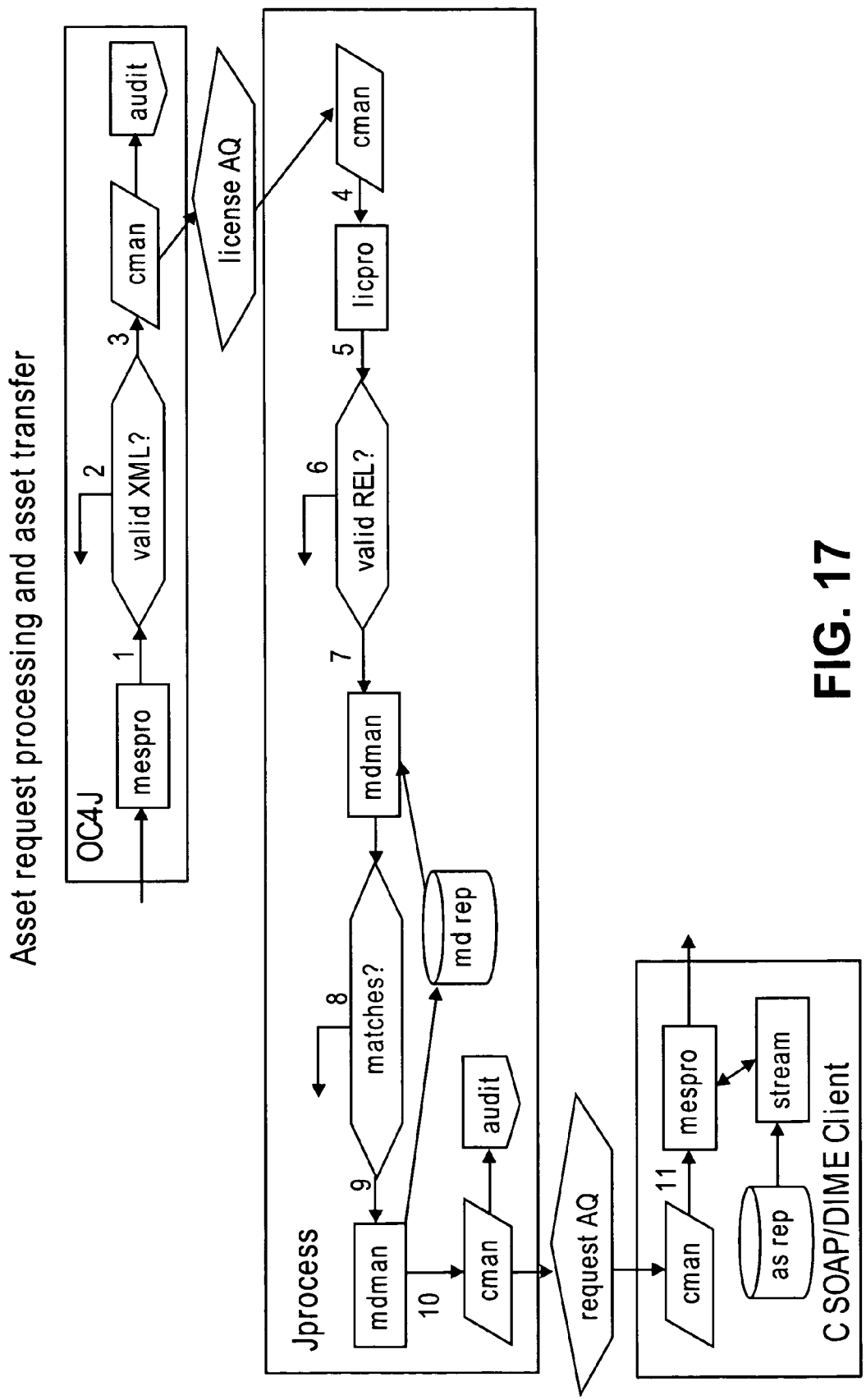
FIG. 17 illustrates an asset request processing and asset transfer flow, according to one embodiment.

FIG. 17 illustrates an asset request processing and asset transfer flow, according to one embodiment. In FIG. 17, items 1-6 are the same as in FIG. 16. Items 7-11 are as follows:
7. Is there an asset license earlier accepted by this destination TIE that matches one sent with the request? Is it still not expired?
8. No, reject request
9. Yes, mark related metadata in the metadata repository
10. Audit and place request in AQ
11. Stream the asset to the requesting TIE.

Components Groupings

Figure 18:
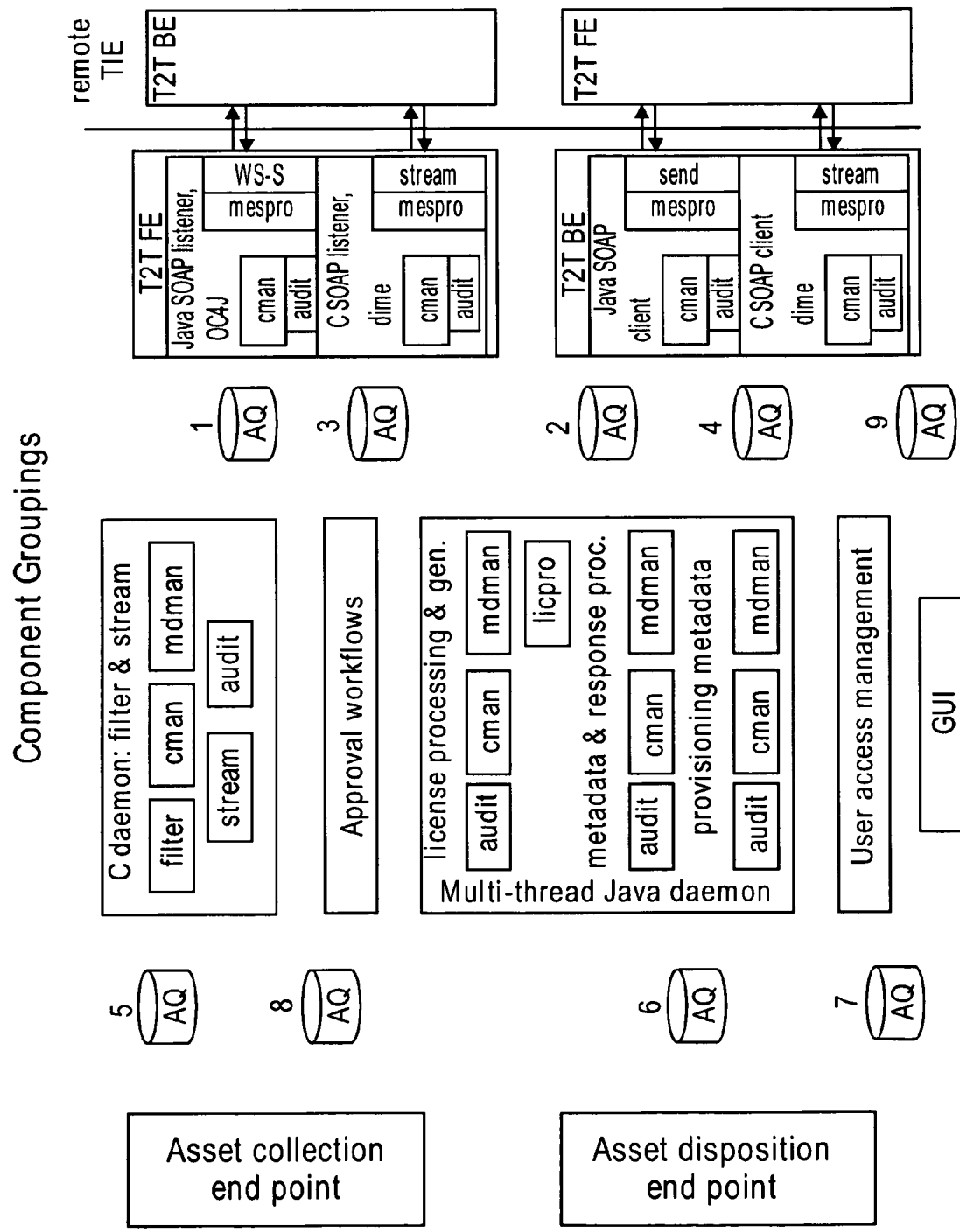
FIG. 18 illustrates various component groupings used in one embodiment.

FIG. 18 illustrates various component groupings used in one embodiment. The component groupings illustrated in FIG. 18 result from data flow use scenarios and security boundaries altering these data flows.

In the embodiment illustrated in FIG. 18, each TIE has Java and C-based main processing component groups, a GUI front-end, and three (3) kinds of messaging components: T2T, A2T, and T2A. Each of the messaging components includes the front-end and back-end. The GUI-based front-end is used for provisioning, administering, asset reviews, and other uses. Specific examples are given hereafter about how the various components may be implemented. However, these are merely examples of how TIE components may be implemented. The invention is not limited to these details.

In the embodiment illustrated in FIG. 18, the TIE system includes a Java SOAP listener (OC4J—Oracle Application Server Containers). Specifically, OC4J for J2EE is the core J2EE runtime component of Oracle Application Server. This component processes a SOAP/WSDL message, places the content (asset) into the temporary store, and extracts the associated metadata transferred as SOAP message parameters.

The TIE system illustrated in FIG. 18 further includes a Web Services-Interoperability compliant (WS-I) Java SOAP Client, which is a regular SOAP client conforming to interoperability standards for ease of integration and communication with third-party TIE implementations.

The TIE system illustrated in FIG. 18 uses Streaming SOAP/DIME (Simple Object Access Protocol/Direct Internet Message Encapsulation). DIME was designed as a lightweight binary message format with SOAP/HTTP bindings. DIME allows an unlimited number of 2 Gb records to be defined, which in combination with HTTP chunking enable implementations to process the unlimited-size SOAP message transfers required by the TIS system.

The TIE system illustrated in FIG. 18 includes a C SOAP Listener. The C SOAP Listener is a web server component that processes a SOAP/WSDL message using the streaming SOAP/DIME protocol, streams the content (asset) into the temporary store, and extracts the associated metadata transferred as SOAP message parameters or XML attachment.

The TIE system illustrated in FIG. 18 includes a C SOAP Client. The C SOAP client uses the streaming SOAP/DIME protocol to transfer assets to remote TIEs.

The TIE system illustrated in FIG. 18 further includes a GUI front-end. The GUI front-end is primarily a UI component responsible for the collection and initial validation of provisioning and system administration data and monitoring of the systems health and transactions.

The "Provisioning metadata" group of components illustrated in FIG. 18 is responsible for the final validation of provisioning and system (configuration, etc.) data. Based on this data it updates existing metadata or creates new metadata.

The "User-access management" group of components illustrated in FIG. 18 is a user-access manager component to manage authentication and authorization of TIE system human users. The "Metadata & response processing" group of components handles asset metadata and semantics of different kinds of responses. The "License processing and generation" group of components, using the metadata and configuration data, is responsible for the license generation, initiation of license distribution, and license processing and validation. It also handles metadata associated with licenses. The "Filter & stream" group of components is responsible for content (asset) filtering and local streaming. It is C language based for efficiency reasons. This part of the system is domain specific and might not be present in solutions for some domains. Approval workflows (AWF) represent the components that handle human-assisted activities. Approval workflows might include a workflow engine, configurable email notifications, pages, etc.

In one embodiment, Advance Queuing (AQ) is the main mechanism in TIE systems used for an asynchronous control transfer. AQ is a complete async/synchronous cross-tier messaging infrastructure. According to one embodiment, the TIE system employs the following AQ types:

1. Contains: licenses (subscription and asset) received from other TIEs, responses from other TIEs in regard to licenses sent, check status messages from other TIEs, notifications about license and asset distribution flows, license revocation notifications, responses from other TIEs to asset request messages, and possibly other communication messages
2. Contains messages to be sent by the back-end. This includes all messages listed for the previous type except synchronous responses sent by the back-end itself and send asset notices instead of asset received notices.
3. Contains notices in regard to assets received from other (source) TIEs
4. Contains notices to sent assets to other (destination) TIEs
5. Contains notices in regard to assets received from internal applications
6. Contains asset disposition notices
7. Contains metadata received from the provisioning and system administration components
8. Contains requests for asset purging
9. Contains results of approval workflows Messages Received by T2T Front-End In one embodiment, messages received by the T2T front-end from another TIE are sent by the T2T back-end to another TIE. Thus, it is sufficient to describe messages received by the front-end and its synchronous responses. Each such message has two or more corresponding data and control flows. These flows include: message creation on the original (source) side and message processing on another (destination) side. The flows also might include response processing back on the original side, provisioning of metadata used in the message, etc.

In one embodiment, the T2T front-end receives the following messages:
1. Receive a subscription license. Check syntax. Send 'received/invalid syntax'.
2. Receive 'accepted/rejected (rejection Id)' in regard to the subscription license previously sent. Respond 'received/invalid syntax'.
3. Receive an asset license. Check syntax. Send 'received/invalid syntax'
4. Receive 'accepted/rejected (rejection Id)' in regard to asset license previously sent. Respond 'received/invalid syntax'.
5. Receive 'check status' for a previously received license (subscription or asset). Send 'received/invalid syntax/accepted/rejected (rejection Id)/wrong license id'.
6. Receive 'asset request'. Send 'received/invalid syntax'. The asset request needs more discussion'.
7. Receive 'reject asset request' (expired, etc.) in regard to the asset previously requested. Respond 'received/invalid syntax'
8. Receive an asset previously requested. Send 'received/error'
9. Receive a notification 'license such has been issued to TIE named XYZ'. Send 'received/invalid syntax'
10. Receive 'approved/wrong use of license' in regard to the notification of license distribution previously sent.
11. Receive 'license such is revoked'. Send 'received/invalid syntax'. This message is sent by TIE that issued that license
12. Receive 'license such is invalidated'. Send 'received/invalid syntax'. This message is sent by TIE that was issued that license and now needs to reject it (late rejection).
13. Receive a query for assets on a particular topic or a group of topics. Send 'received/invalid syntax'
14. Receive a set of asset descriptions in response to a query.
15. Receive a request for licenses on assets whose descriptions where previous sent in response to a query.
16. Receive a request 'renew license such'. Send 'received/invalid syntax'
17. Receive a response to #16 'renewed/rejected (rejection Id)'

Hardware Overview

Figure 19:
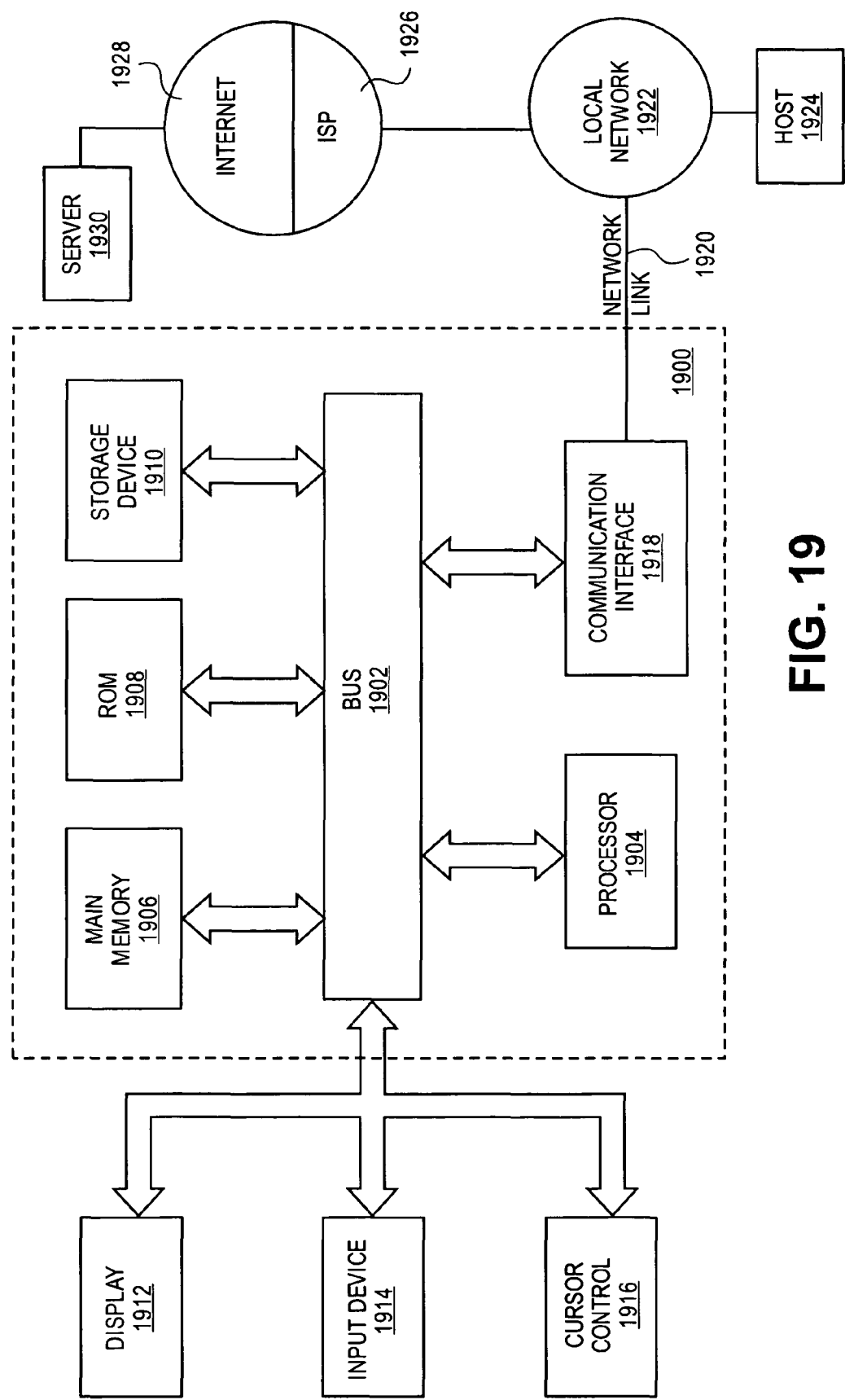
FIG. 19 is a block diagram of a computer system that may be used to implement embodiments of the invention.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for implementing the techniques described herein. According to one embodiment of the invention, those techniques are performed by computer system 1900 in response to processor 1904 executing one or more sequences of one or more instructions contained in main memory 1906. Such instructions may be read into main memory 1906 from another machine-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1900, various machine-readable media are involved, for example, in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 126 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution. In this manner, computer system 1900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of exchanging digital information, comprising:

sending over a network system, from a first system controlled by a first party, to a second system controlled by a second party, a subscription agreement that is digitally signed by the first party and includes a digital identity of the second party;

wherein the subscription agreement defines characteristics of digital assets that are covered by the subscription agreement;

wherein the subscription agreement licenses the second party to perform a set of operations relative to digital assets that have said characteristics;

receiving at the first system, from the second system, a subscription agreement confirmation that is digitally signed by the second party;

after receiving the subscription agreement confirmation, the first system identifying a digital asset that has said characteristics;

prior to providing the digital asset to the second system, sending from the first system to the second system a trust agreement that is digitally signed by the first party and includes the digital identity of the second party;

wherein the trust agreement licenses the second party to perform said set of operations relative to said digital asset;

receiving at the first system, from the second system, a trust agreement confirmation that is digitally signed by the second party;

after the trust agreement confirmation is received by the first system, the first system providing the digital asset to the second system; and wherein the method is performed by one or more machines programmed to be special purpose machines pursuant to instructions from program software.

2. The method of claim 1 wherein the subscription license includes an embedded license that specifies all terms of the asset license.

3. A non-transitory computer-readable storage medium storing one or more sequences of instructions which, when executed by one or more processors, causes:

sending over a network system, from a first system controlled by a first party, to a second system controlled by a second party, a subscription agreement that is digitally signed by the first party and includes a digital identity of the second party;

wherein the subscription agreement defines characteristics of digital assets that are covered by the subscription agreement;

wherein the subscription agreement licenses the second party to perform a set of operations relative to digital assets that have said characteristics;

receiving at the first system, from the second system, a subscription agreement confirmation that is digitally signed by the second party;

after receiving the subscription agreement confirmation, the first system identifying a digital asset that has said characteristics;

prior to providing the digital asset to the second system, sending from the first system to the second system a trust agreement that is digitally signed by the first party and includes the digital identity of the second party;

wherein the trust agreement licenses the second party to perform said set of operations relative to said digital asset;

receiving at the first system, from the second system, a trust agreement confirmation that is digitally signed by the second party;

after the trust agreement confirmation is received by the first system, the first system providing the digital asset to the second system; and wherein the method is performed by one or more machines programmed to be special purpose machines pursuant to instructions from program software.

4. The non-transitory computer-readable storage medium as recited in claim 3, wherein the subscription license includes an embedded license that specifies all terms of the asset license.

* * * * *

UNITED STATES PATENT AND TRADEMARK OFFICE
CERTIFICATE OF CORRECTION

| | | |
|---|---|---|
| PATENT NO. | : 8,682,795 B2 | Page 1 of 1 |
| APPLICATION NO. | : 11/518481 | |
| DATED | : March 25, 2014 | |
| INVENTOR(S) | : Lenkov et al. | |

It is certified that error appears in the above-identified patent and that said Letters Patent is hereby corrected as shown below:

In the Specification

In column 6, line 64, delete "Propogation" and insert -- Propagation --, therefor.

In column 8, line 14, delete "that that agreement" and insert -- that agreement --, therefor.

In column 8, line 48, delete "Tie" and insert -- TIE --, therefor.

In column 10, line 26, delete "and or" and insert -- and/or --, therefor.

In column 10, line 63, delete "and or" and insert -- and/or --, therefor.

In column 13, line 60, delete "Propogation" and insert -- Propagation --, therefor.

In column 16, line 31, delete "exercised" and insert -- exercised. --, therefor.

In column 19, line 15, delete "Terminated" and insert -- Termination --, therefor.

In column 24, line 28, delete "now" and insert -- now. --, therefor.

In column 24, line 42, delete "Components" and insert -- Component --, therefor.

In column 25, line 7, delete "2 Gb" and insert -- 2Gb --, therefor.

Signed and Sealed this
Second Day of September, 2014

Michelle K. Lee
*Deputy Director of the United States Patent and Trademark Office*